(12) United States Patent
Itoh et al.

(10) Patent No.: US 6,355,122 B1
(45) Date of Patent: Mar. 12, 2002

(54) METHOD FOR ULTRASONICALLY CONNECTING AND INSPECTING SLIDER-LEAD JOINTS FOR DISK DRIVE HEAD GIMBAL ASSEMBLIES

(75) Inventors: Kenji Itoh; Naoki Kurosu, both of Fujisawa; Yohtaroh Ichimura, Yokohama; Tatsushi Yoshida, Chigasaki, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/603,121

(22) Filed: Jun. 22, 2000

(30) Foreign Application Priority Data

Jun. 28, 1999 (JP) ............................................ 11-181989

(51) Int. Cl.[7] ............................. B23K 1/06; B23K 20/10
(52) U.S. Cl. ...................... 156/64; 156/73.1; 228/110.1
(58) Field of Search ...................... 156/64, 73.1, 308.2, 156/308.4, 309.6, 378, 379, 580.1, 580.2; 228/110.1, 1.1

(56) References Cited

U.S. PATENT DOCUMENTS

| | | | | |
|---|---|---|---|---|
| 3,608,809 A | * | 9/1971 | Cushman | 228/5.5 |
| 4,142,662 A | * | 3/1979 | Holbrook et al. | 228/110.1 |
| 4,341,574 A | * | 7/1982 | Landes | 156/64 |
| 4,842,662 A | * | 6/1989 | Jacobi | 228/110.1 |
| 5,843,255 A | * | 12/1998 | Matsui et al. | 156/73.1 |
| 6,296,171 B1 | * | 10/2001 | Hembree et al. | 228/110.1 |

* cited by examiner

Primary Examiner—James Sells
(74) Attorney, Agent, or Firm—Robert B. Martin; Bracewell & Patterson, L.L.P.

(57) ABSTRACT

A set of bonding pads are ultrasonically connected to a set of leads. The bonding pads are formed on a predetermined plane of a slider held by a slider holder accessible to the recording plane of a disk in a disk drive. The leads are held by the slider holder and have joints that are formed so as to respectively face each of the bonding pads. A front end plane of a wedge working on the joints is tilted in a direction in which the first sides of the joints correspond to external connection sides. The ultrasonic connection is completed by pressing the joints of the leads against the faced boding pads.

11 Claims, 18 Drawing Sheets

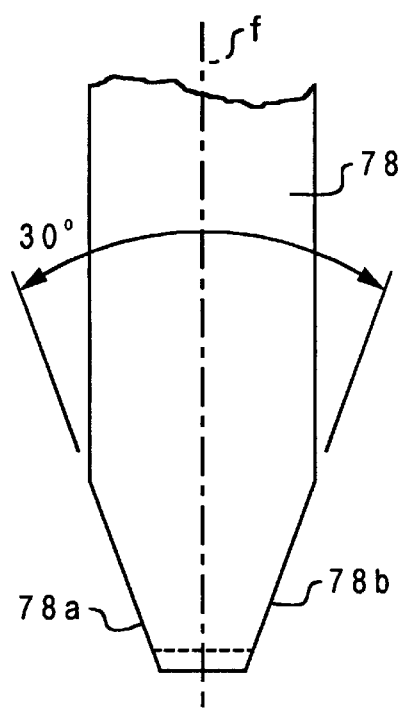
Fig. 12
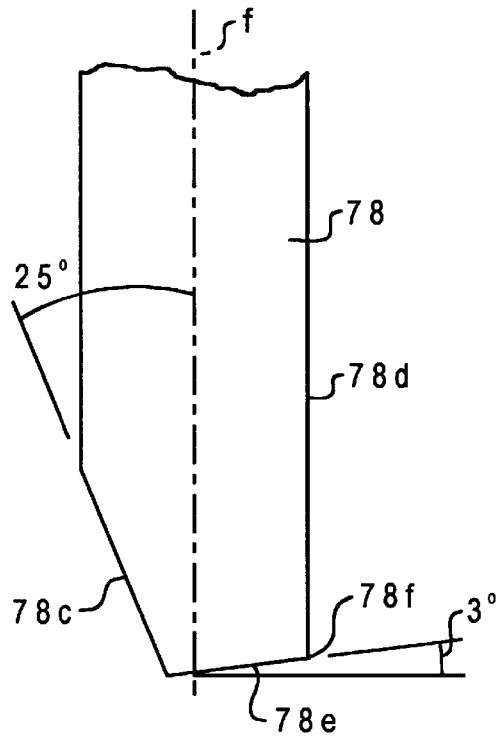
Fig. 13
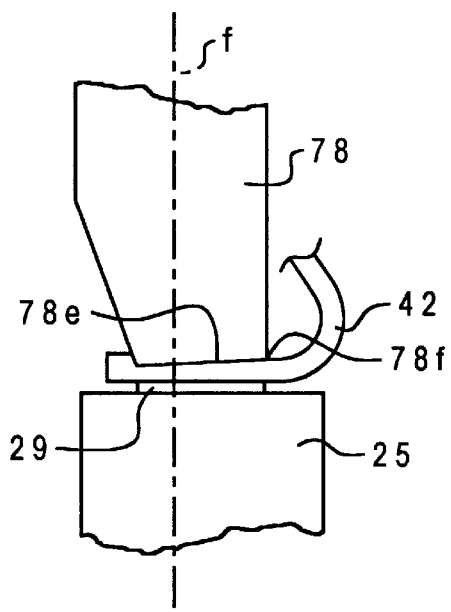
Fig. 14
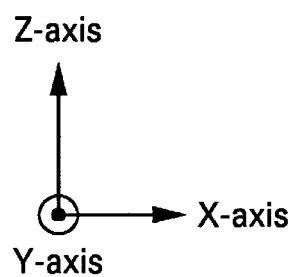

METHOD FOR ULTRASONICALLY CONNECTING AND INSPECTING SLIDER-LEAD JOINTS FOR DISK DRIVE HEAD GIMBAL ASSEMBLIES

BACKGROUND OF THE INVENTION

1. Technical Field

The present invention relates to a method for manufacturing and inspecting a disk drive head gimbal assembly (hereafter referred to as an HG assembly), and in particular to a method for forming and inspecting a joint on an HG assembly slider terminal and head lead.

2. Description of the Related Art

Referring now to FIG. 27, a conventional ultrasonic connection between a slider 180 and a lead 182 is shown. A bonding pad 181 on a front end plane 180a of slider 180 is ultrasonically connected to lead 182. A wedge 183 on an ultrasonic bonder (not shown) presses the elements in the direction of arrow S as ultrasonic vibrations are applied to bonding pad 181 and lead 182 in the directions of arrows T and U.

The front end 182a of lead 182 is adjacent to bonding pad 181. The front end of wedge 183 is pointed in order to concentrate vibration energy on the joint.

The front-end plane 183a of the wedge 183 and the front-end plane 180a of the slider 180 are kept almost parallel by a not-illustrated connector.

Moreover, to perform ultrasonic connection, the left-side plane 180b of the slider 180 is brought into contact with a position controller 188 and a holder 187 for holding the slider 180 is normally pressed by a flat spring from the right of the holder 187 through a suspender 189 to press the slider 180 against the position controller 188 and fix it.

FIG. 28 is an illustration for explaining a method for inspecting a deformed shape of the lead 182 after connected and a joint. The ultrasonic-connected lead 182 is held by a damper 185 held by a pulling inspection jig 184 nearby the joint and pulled in the right top direction (direction of arrow V) in the drawing. Thereby, the lead 182 is broken or the joint is separated and the connected state is checked while referring to the then tension.

SUMMARY OF THE INVENTION

A set of bonding pads are ultrasonically connected to a set of leads. The bonding pads are formed on a predetermined plane of a slider held by a slider holder accessible to the recording plane of a disk in a disk drive. The leads are held by the slider holder and have joints that are formed so as to respectively face each of the bonding pads. A front end plane of a wedge working on the joints is tilted in a direction in which the first sides of the joints correspond to external connection sides. The ultrasonic connection is completed by pressing the joints of the leads against the faced boding pads.

When ultrasonic-connecting a plurality of bonding pads formed on a slider integrally fixed to a flexure accessible to the recording plane of a disk of a disk drive with a plurality of leads which are fixed to at least the platform of the flexure and whose joints are formed so as to respectively face each of the bonding pad, the side plane of a wedge working on the joints of the leads facing the platform is not tapered in order to perform ultrasonic connection by pressing the joints of the leads against the faced bonding pads.

When ultrasonic-connecting a plurality of bonding pads formed on a slider held by a slider holder accessible to the recording plane of a disk of a disk drive through elastic means with a plurality of leads which is held by the slider holder and whose joints are formed so as to respectively face each of the faced bonding pads, front ends of the leads are arranged so as to be located outside of the range of the bonding pads.

When ultrasonic-connecting a plurality of bonding pads formed on a slider held by a slider holder accessible to the recording plane of a disk of a disk drive through an elastic body with a plurality of leads whose joints are formed so as to respectively face each of the bonding pads, movement of the slider in the vibrational direction is fixed by a position controller for controlling the position of the slider at least one side of the vibrational direction under ultrasonic connection and a working unit for pressing the slider against the controller by directly working on the slider from the other side of the vibrational direction.

When ultrasonic-connecting a plurality of bonding pads formed on a predetermined plane of a slider held by a slider holder accessible to the recording plane of a disk of a disk drive with a plurality of leads which is held by the slider holder and whose joints are formed so as to respectively face each of the bonding pads, movement of a wedge working on the joints of the leads is monitored in order to perform ultrasonic connection by pressing the joints against the faced bonding pads to stop the ultrasonic connection in accordance with the movement information showing the movement of the wedge. When inspecting a slider in which a plurality of bonding pads formed on the slider held by a slider holder accessible to the recording plane of a disk of a disk drive is ultrasonic-connected with a plurality of leads which is held by the slider holder and whose joints are formed so as to respectively face each of the bonding pads when inspecting the joints between the slider and the leads, a connected state is inspected by pressing a pushpin against vicinities of the ultrasonic-connected joints of the leads.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 12 is a front view showing the front-end shape of a wedge 78;

FIG. 13 is a side view showing the front-end shape of a wedge 78;

FIG. 14 is an illustration showing a state for a wedge 78 to press the connection terminal of a lead;

DETAILED DESCRIPTION OF ILLUSTRATIVE EMBODIMENT

Figure 1:
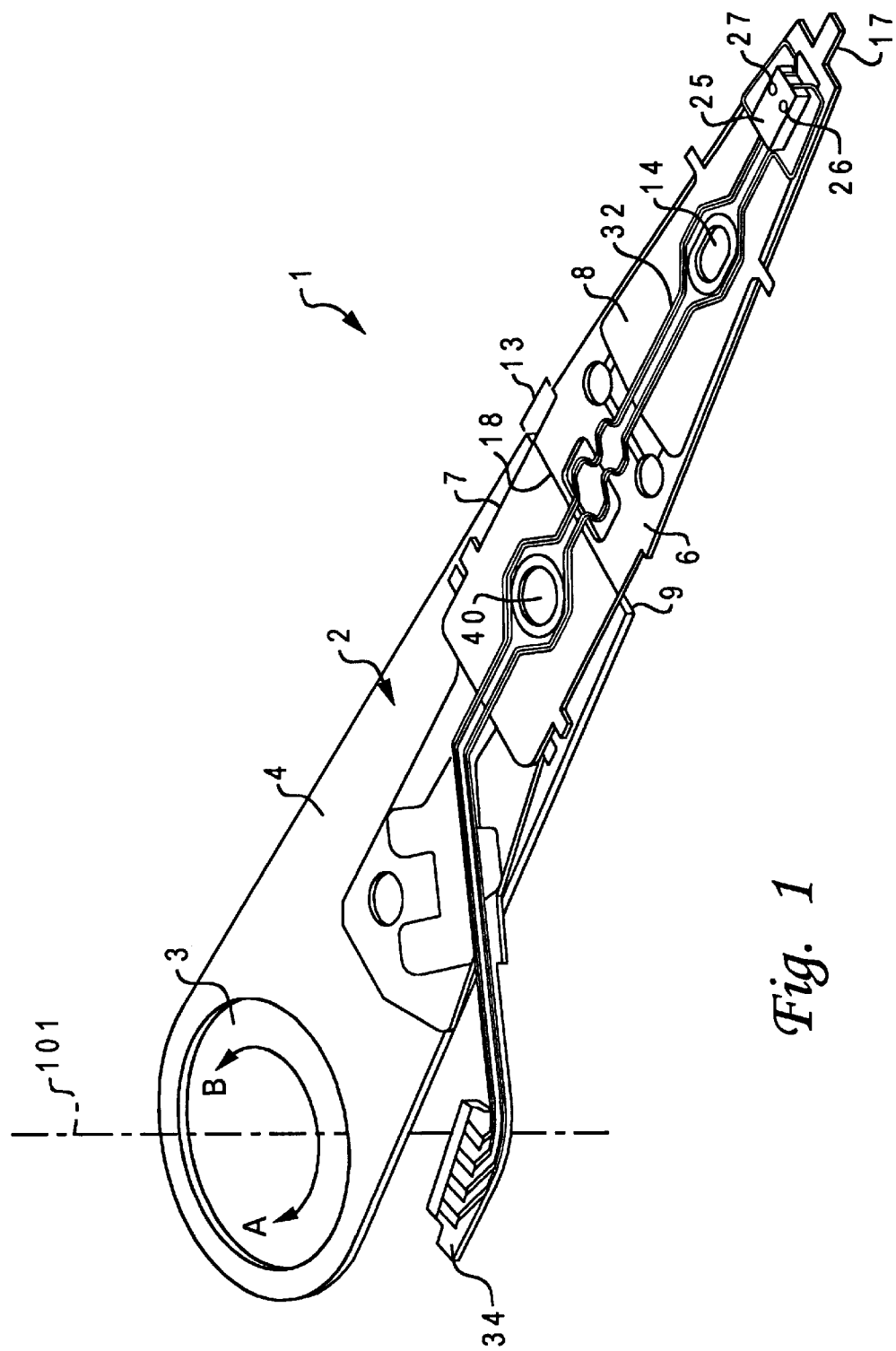
FIG. 1 is a perspective view of a head gimbal assembly 1 used for embodiments of the present invention.
Figure 2:
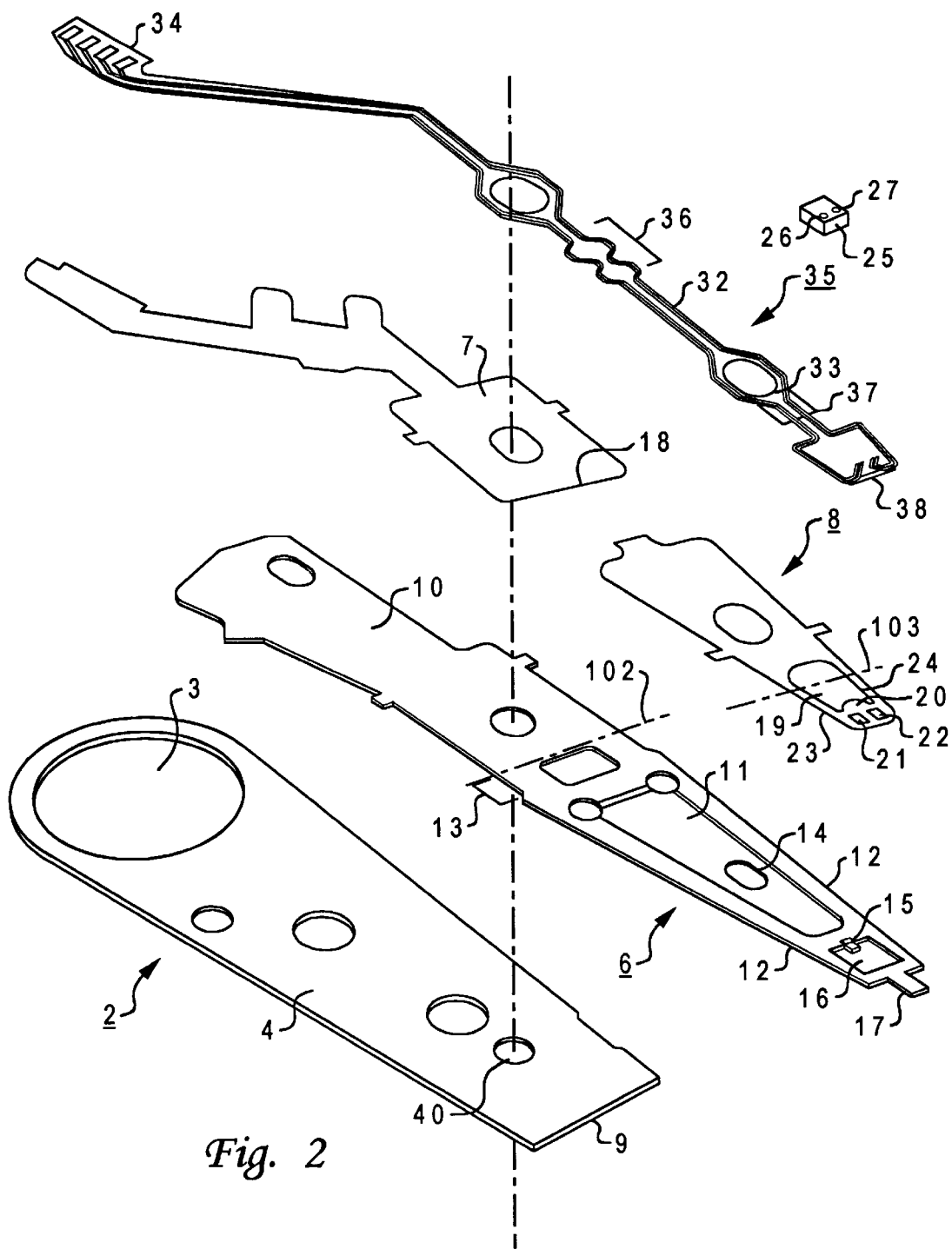
FIG. 2 is an exploded perspective view showing a head gimbal assembly 1 in series by disassembling overlapped components of the assembly 1.

FIG. 1 is a perspective view of an HG assembly 1 used for embodiments of the present invention. FIG. 2 is an exploded perspective view showing the HG assembly 1 in series by disassembling overlapped components of the assembly 1. In FIG. 1, an actuator arm 2 is rotatably held by the holder of a magnetic disk drive (not shown). In this case, an opening 3 is used to hold the actuator arm 2 and actuator arm 2 is rotated in the directions of arrows A and B about a virtual axis 101 (FIG. 1) passing through the center of the opening 3 and almost vertical to a plane 4. The actuator arm 2 is rotated by a voice coil motor (not shown).

A load beam 6, a mount plate 7, and a flexure 8 are bonded each other in accordance with the predetermined relation described below and particularly, the load beam 6 and the flexure 8 constitute an integrated suspension. The plane 10 of the load beam 6 is fixed and bonded to the plane 4 of the actuator arm 2 so that an end 9 of the actuator arm 2 is parallel with the designation line 102 (FIG. 2) of the load beam 6. The load beam 6 is made of elastic stainless steel having a thickness of, for example, 0.038 to 0.05 mm so that it is thin and lightweight and a necessary rigidity can be kept.

A substantially trapezoidal, concave portion 11 recessed in the vertical direction of the drawing is formed on a predetermined portion not bonded to the actuator arm 2 of the load beam 6 by press process and moreover, the both margins along the longitudinal direction are bent except a portion 13 nearby the end 9 to form a flange 12 (FIG. 3) and thereby improve the rigidity. The portion 13 where the flange 13 is not formed constitutes an elastic hinge portion.

Moreover, a tape-red oval control hole 14 is formed in the concave portion 11 of the load beam 6 and an almost quadrangular opening 16 is formed nearby the front end of the concave portion 11. A gimbal pivot 15 protruded toward the upper side of the drawing is formed in a protrusion which protrudes from the center of one side of the opening 16 nearby the concave portion 11 to the center of the opening 16 and a tab 17 is formed at the front end of the load beam 6.

The mount plate 7 and the flexure 8 are bonded to the load beam 6. In this case, the mount plate 7 is arranged so that an end 18 becomes parallel with the designation line 102 (FIG. 2) of the load beam 6. Moreover, the flexure 8 is bonded to the load beam 6 except the portion closer to the front end from a designation line 103 (FIG. 2) so as to cover the trapezoidal concave portion 11 of the load beam 6.

The flexure 8 is made of stainless steel having a thickness of, for example, approx. 20 mm and has a desired elasticity. An arch-shaped opening 19 is formed in a range from the bonded portion to the non-bonded portion and a suspension tongue 20 protruded toward the center of the opening 19 is formed on the central portion of the bottom of the side of the opening 19 closer to the front end of the flexure 8. It is permitted to make the mount plate 7 out of stainless steel having the same quality as that of the flexure 8.

An integrated conductive lead 35 is formed by integrally bonding four leads 32 to a very-thin insulating sheet 33 so that the leads 32 do not contact with each other. One ends of the leads are lined up so as to constitute a multiple connector 34 and the other ends of the leads are bent so as to be connected to four bonding pads 28, 29, 30, and 31 (FIG. 9) formed on a slider 25 in accordance with a connection method to be described later.

Moreover, the portion extending from the multiple connector 34 of the integrated conductive lead 35 to a bent portion 36 (excluding the bent portion 36) is bonded onto to the mount plate 7 as shown in FIG. 1. Then, the portion extending from the bent portion 36 (excluding the bent portion 36) up to the terminal portion 37 of the insulating sheet 33 and the bent other ends of the leads 32 are bonded to the flexure 8. These other ends are bonded through an insulating sheet 38.

Figure 9:
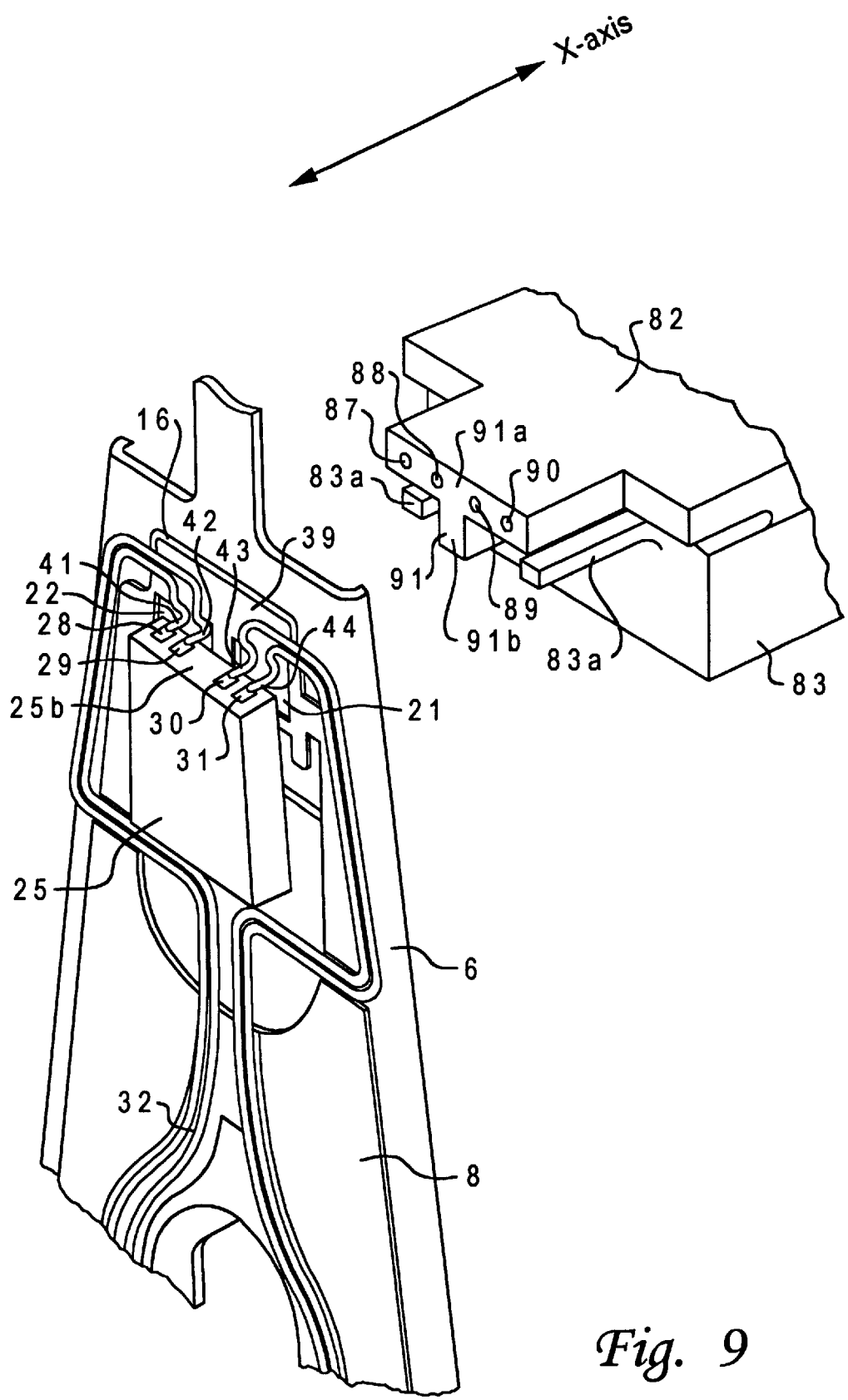
FIG. 9 is a perspective view of vicinities of front ends of a slider 25 and an aspirator 80 when viewed from the top left this side.

A magneto resistive head (hereafter referred to as MR head) for reading data 26 and an electromagnetic-induction-type write head 27 are arranged on a predetermined position of the slider 25 (because the head in the drawing is shown for convenience' sake, the position of it is not accurate). These heads respectively have two leads (not shown) and each lead is connected to four bonding pads 28, 29, 30, and 31 (FIG. 9). Moreover, the slider 25 is fixed to the suspension tongue 20 by an adhesive.

Then, the arrangement between a pair of flexure arms 23 and 24 configured by the both sides of the opening 19 of the flexure 8, a pair of openings 21 and 22 formed nearby the front end of the flexure 8, the gimbal pivot 15 formed on the load beam 6, and the slider 25 bonded to the suspension tongue 20 is described below.

Figure 3:
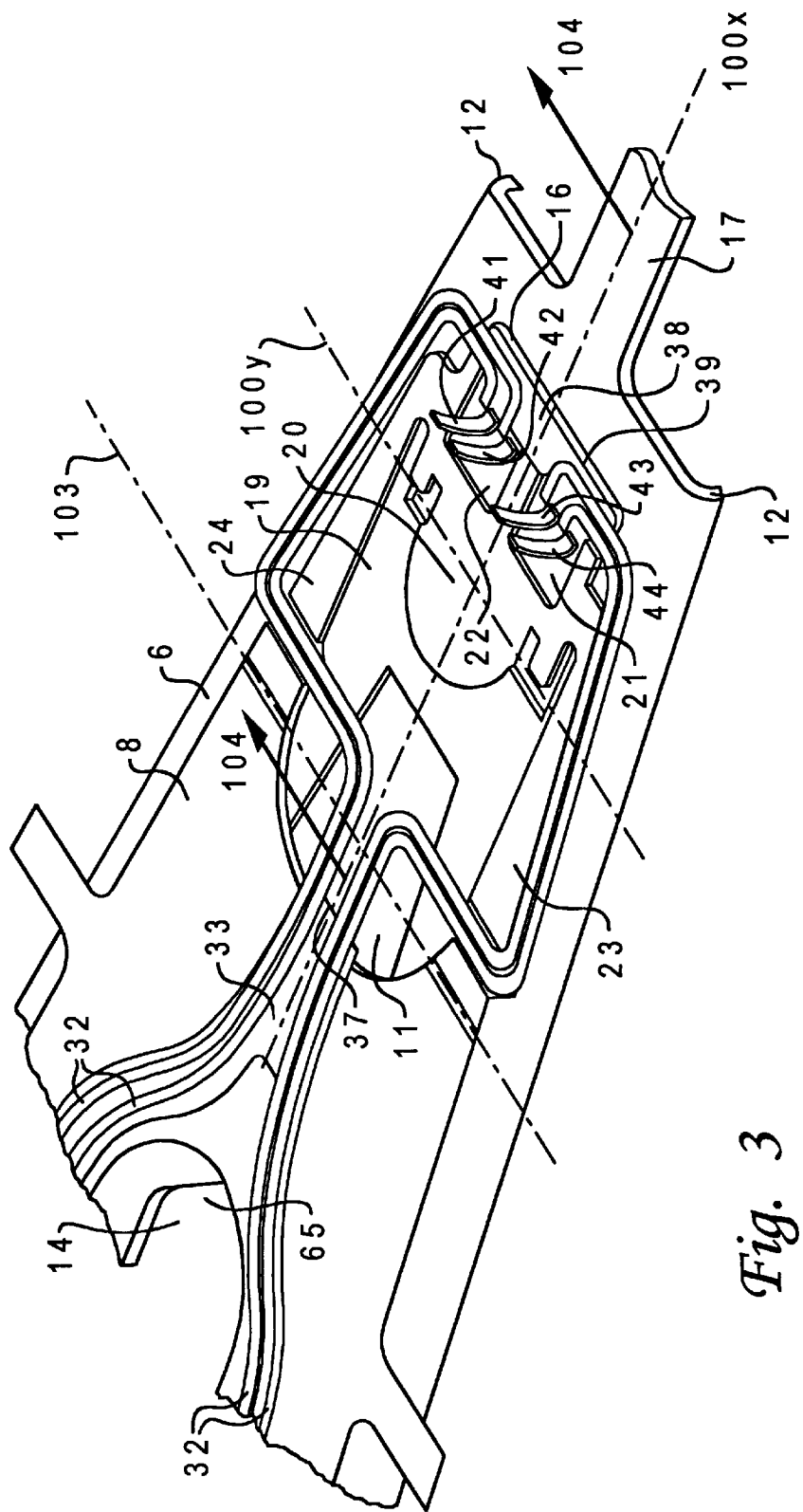
FIG. 3 is a partially enlarged view of the front end of a head gimbal assembly 1 before a slider 25 is set.
Figure 4:
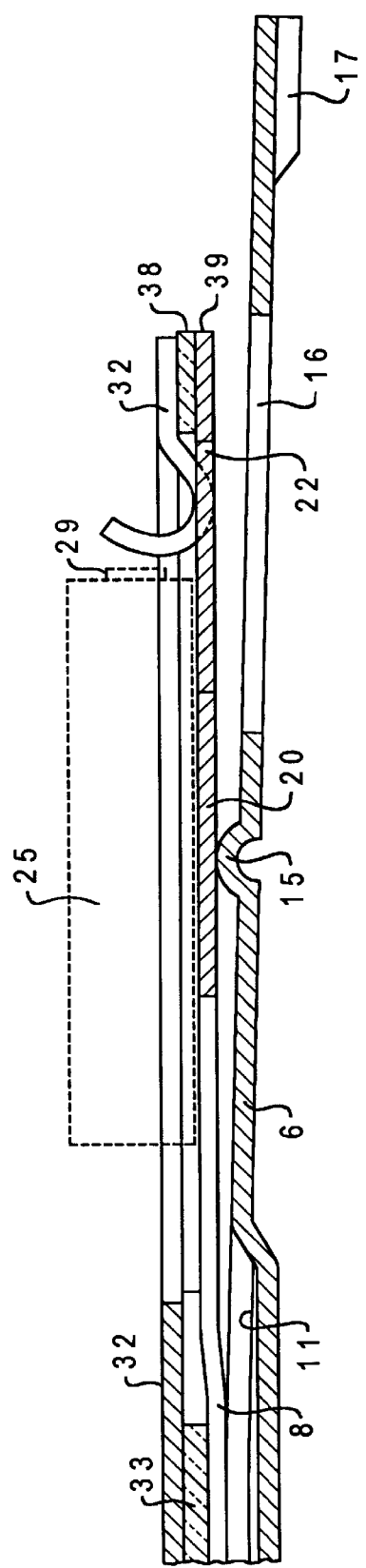
FIG. 4 is a sectional view at the position shown by a designation line 104 in FIG. 3.

FIG. 3 is a locally enlarged view of the front end of the HG assembly 1 before the slider 25 is set and FIG. 4 is a sectional view of the front end at the position shown by a designation line 104.

The gimbal pivot 15 (FIG. 4) is formed on the load beam 6 as described above. Moreover, the flexure 8 is bonded to the load beam 6 up to the designation line 103 and flexure arms 23 and 24 extending without being bonded elastically support the suspension tongue 20 continued from the arms 23 and 24.

By connecting the load beam 6 with the flexure 8, the suspension tongue 20 is supported by the gimbal pivot X-axis (FIG. 3) corresponding to the centerline of the flexure 8 in the longitudinal direction and 100 Y-axis passing through the contact portion and orthogonal to X-axis is shown in FIG. 1. In this case, the flexure arms 23 and 24 are slightly bent to press the suspension tongue 20 against the gimbal pivot 15.

The slider 25 is set to the suspension tongue 20 so that the central portion of the slider 25 almost overlaps with the contact portion with the gimbal pivot 15 (shown by a broken line in FIG. 4). Thereby, the slider 25 can slightly rotate about 100 X-axis and 100 Y-axis and tilt in all directions by a predetermined angle.

The four leads 32 are fixed to the flexure 8 up to the terminal portion 37 of the insulating sheet 33 and moreover, fixed to the flexure 8 located at the opposite side to the suspension tongue 20 at the platform 39 at the foremost end of the flexure 8 through the insulating sheet 38 at the both sides of two openings 21 and 22.

The four leads 32 are bent like a crank every pair of leads 32 along the flexure arms 23 and 24 and levitated so that they do not contact with each other.

The other ends of pairs of leads 32 are bent from the platform 39 toward the suspension tongue 20 through the openings 21 and 22 and moreover, they form connection terminals 41, 42, 43, and 44 bent like a hook so as to face the bonding pads 28, 29, 30, and 31 (FIG. 9) formed on the slider bonded to the suspension tongue 20.

Figure 5:
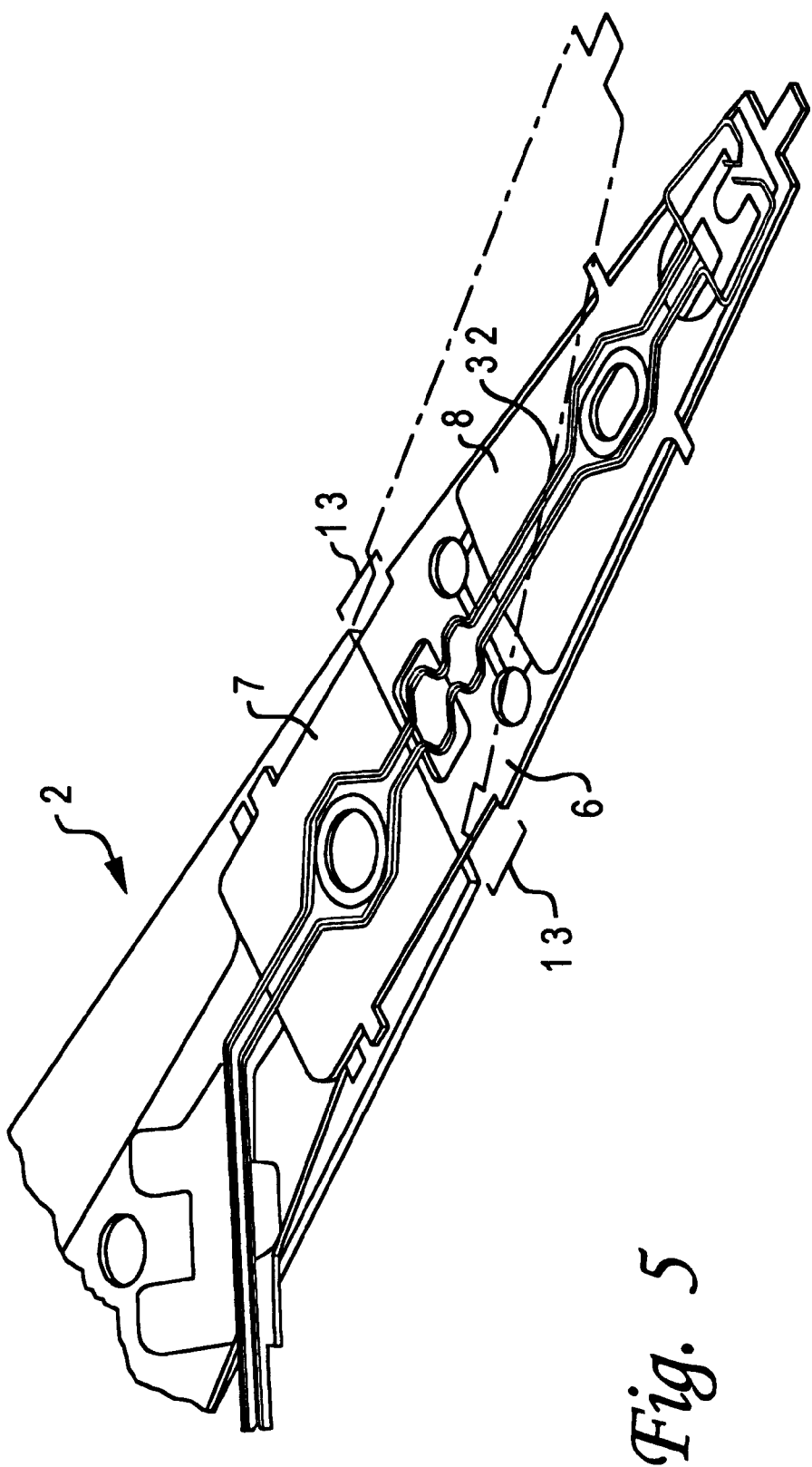
FIG. 5 shows a head gimbal assembly bent by approx. 19° by the hinge 13 of a load beam 6.

The HG assembly 1 excluding the slider 25 configured as described above is bent at the hinge 13 of the load beam 6 by, for example, approx. 19° as shown by the alternate long and short dash line in FIG. 5. Because this bend is due to plastic deformation, this angle is kept under natural state.

A method for bonding the slider 25 to the suspension tongue 20 of the above flexure 8 is described below.

Figure 6:
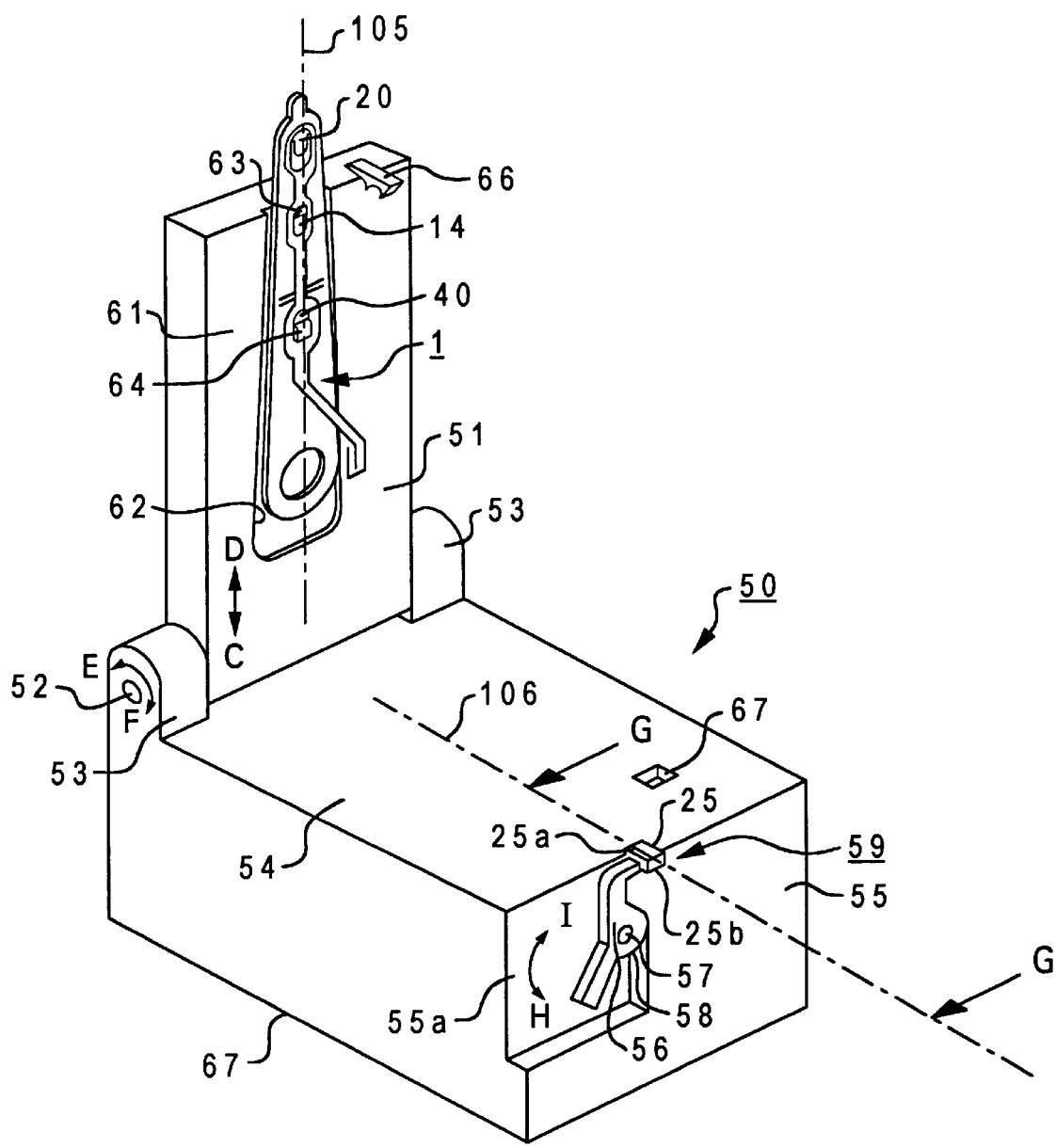
FIG. 6 is a perspective view of a connection jig.

FIG. 6 is a perspective view showing a connection jig 50 for positioning the suspension tongue 20 of the HG assembly 1 before the slider 25 is bonded and connecting them each other.

A pair of supports 53 and 53 for rotatably holding an HG-assembly holding plate 51 is formed at one end of the upper plane 54 of the connection jig 50. A mounting portion 59 for mounting the slider 25 is formed at the central portion of the other end facing the one end.

The HG-assembly holding plate 51 is biased by a bias unit (not shown) in the direction of the arrow E and its rotation in the direction of the arrow E is limited at the almost vertical position shown in FIG. 6.

A concave portion 55a is formed on the side plane 55 of the mounting portion 59 and a slider fixing lever 56 is rotatably held by the concave portion 55a about an axis 57. The slider fixing lever 56 is rotation-biased by a toggle spring 58 in the direction of the arrow I.

Figure 7:
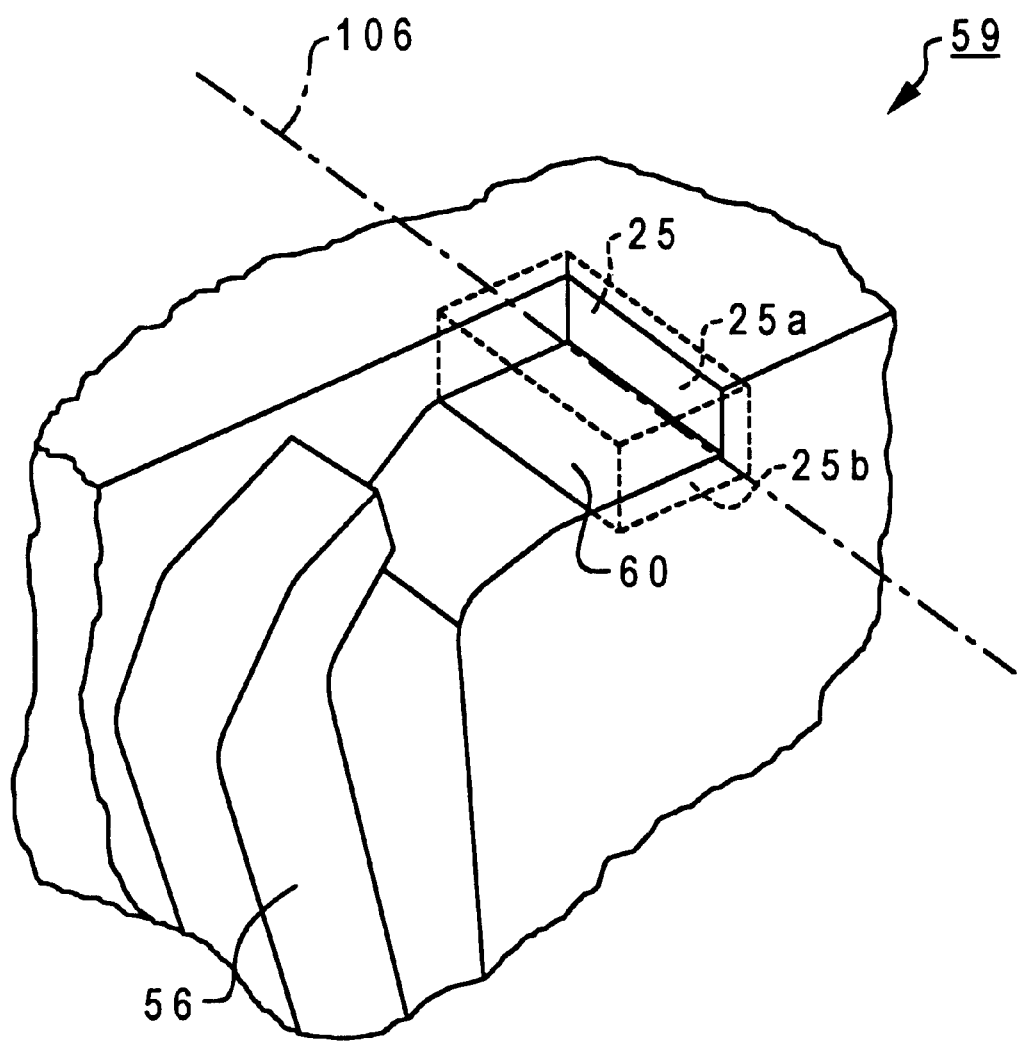
FIG. 7 is a partially enlarged view of a connection-jig-mounting portion.

FIG. 7 is a locally enlarged view of the mounting portion 59 and shows a state in which the slider fixing lever 56 is rotated by an operator against a bias force in the direction of the arrow H. Under the above state, the slider 25 is set to a slider fixing stand 60 for controlling the position of the slider 25 by three adjacent walls as shown by the broken line in FIG. 7.

Then, when the slider-fixing lever 56 is released, the front end of the slider-fixing lever 56 presses the side plane of the slider 25 to fix it. FIG. 6 shows the above state, in which the bonding plane 25a and front plane 25b (FIG. 7) of the slider 25 are set so as to slightly protrude from the upper plane 54 and side plane 55 of the connection jig 50.

A storing concave portion 62 almost along the outline of the HG assembly 1 is formed on the holding plane 61 of the HG-assembly holding plate 51 in order to store the HG assembly 1 before the slider 25 is bonded (FIG. 6). A position control pin 63 and a setting hook 64 are formed at a predetermined position of the storing concave portion 62 on the centerline 105 of the HG-assembly holding plate 51 in the longitudinal direction.

The setting hook 64 is held by an energizing unit (not shown) so as to be slidable by a predetermined range on the centerline 105 and also energized in the direction of the arrow C toward an axis 52.

When an operator sets the HG assembly 1 to the HG-assembly holding plate 51, he (she) first hangs the engagement hole 40 of the HG assembly 1 on the setting hook 64 and pulls the HG assembly 1 against the energizing force in the direction of the arrow D. Then, he (she) fits the position control pin 63 into the tapered oval control hole 14 of the HG assembly 1.

In this case, the position control pin 63 is engaged with a control end 65 (FIG. 3) having a diameter smaller than that of the control hole 14 to position the flexure 8 so that the 100 X-axis (FIG. 3) of the flexure 8 coincides with the centerline 105. Moreover, the HG assembly 1 is bent by approx. 19° at the hinge 13 (FIG. 5) under the above natural state. However, when the assembly 1 is set to the HG-assembly holding plate 51, it extends almost straight because the hinge 13 elastically deforms.

A protrusion (not shown) is formed at the front end of the position control pin 63 at the side engaged with the control hole 14 to prevent the HG assembly 1 from being bent due to the restoring force of the assembly 1 while allowing a slight play.

Thus, the HG assembly 1 and slider 25 are set to the connection jig 50 as shown in FIG. 6. The HG-assembly holding plate 51 is rotated by an operator against a bias force in the direction of the arrow F and when the plate 51 becomes almost horizontal, a locking hook 66 engages with an engagement holder 67 formed at a corresponding position on the upper plane 54 so as to face the HG-assembly holding plate 51 to keep the horizontal position.

In this case, the centerline 106 passing through the center of the bonding plane 25a of the slider and, parallel to the upper plane 54 and orthogonal to the parallel line of the rotation axis 52 almost coincides with the 100 X-axis (FIG. 3) of the flexure 8 so that the suspension tongue 20 of the HG assembly 1 contacts with the bonding plane 25a of the slider 25.

Therefore, at the state in which the HG-assembly holding plate 51 is in a perpendicular position as shown in FIG. 6, by applying a predetermined adhesive to the bonding plane 25a (FIG. 7) of the slider 25 and rotating the HG-assembly holding plate 61 to lock it at a horizontal. position, it is possible to bond the slider 25 to the suspension tongue 20 of the flexure 8. The HG assembly 1 before the slider is set serves as a slider holder.

A method for connecting the bonding pads 28, 29, 30, and 31 (FIG. 9) formed on the slider 25 with the connection terminals 41, 42, 43, and 44 (FIG. 9) of four leads 32 is described below.

Figure 8:
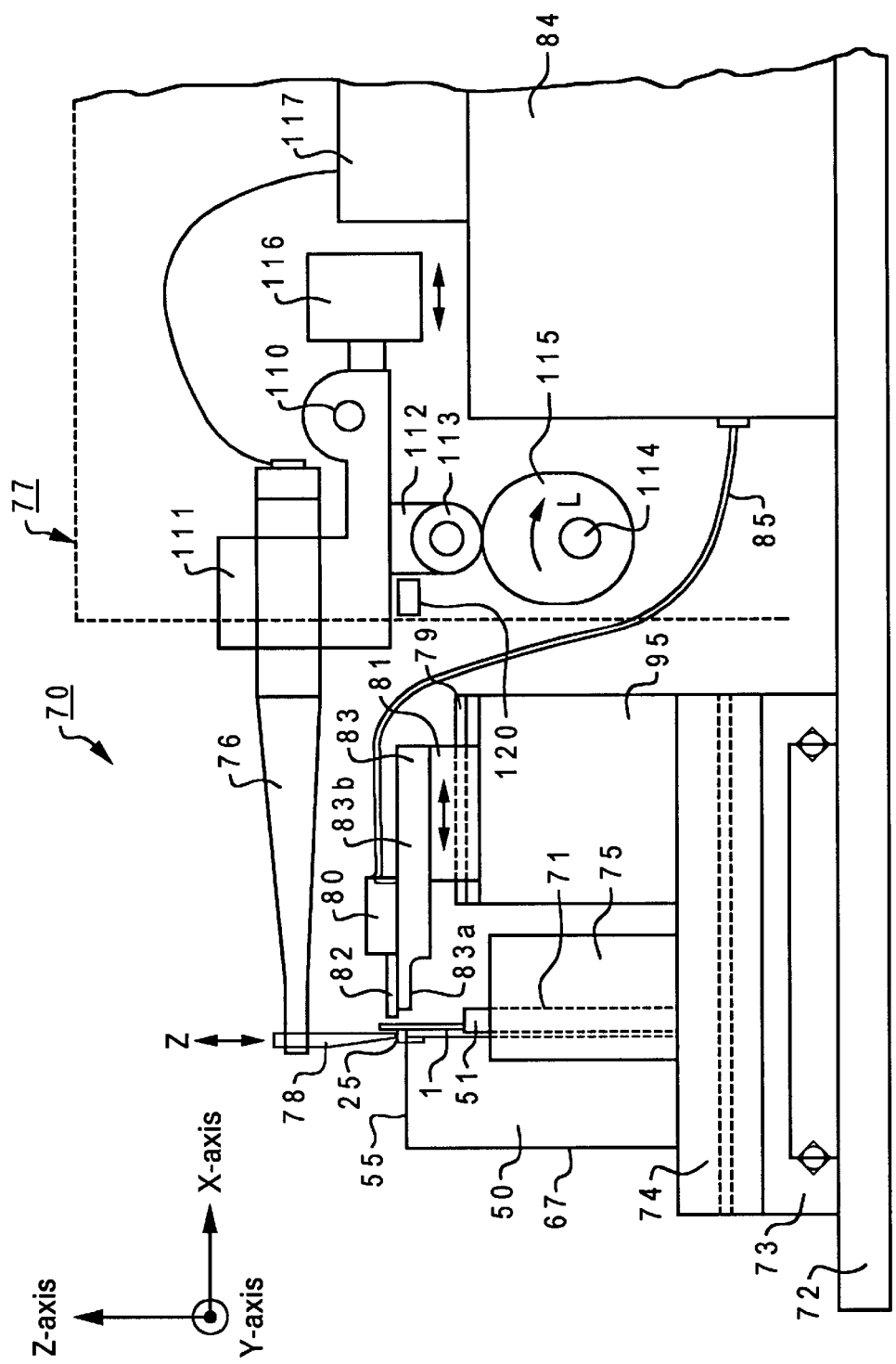
FIG. 8 is a front view showing the configuration of an ultrasonic-connecting apparatus

FIG. 8 is a front view showing the configuration of an ultrasonic-connecting apparatus. An ultrasonic-connecting unit 70 holds a Y table 73 on a base 72 so as to be movable in Y-axis direction. The Y table 73 holds X table 74 so as to be movable in X-axis direction. A position control member 75 having a fitting concave portion 71 to which the HG-assembly holding plate 51 of the connection jig 50 to be mounted by turning the side plane 55 upward is fitted and positioned is formed on the upper plane of the X table 74.

The connection jig 50 is pressed against the position control member 75 from its bottom-67 side by an air clamper (not shown) and fixed onto the X table 74. The Y table 73 and X table 74 are respectively driven by a drive (not shown) to move the connection jig 50 along X-Y plane as described later.

A holding stand 95 fixed onto the X table 74 holds a guide rail 79 extending in X-axis direction and moves a moving stand 81 by a drive (not shown) along X-axis. The moving stand 81 holds a suction stand 83 and an aspirator 80 is slidably held on the upper plane 83b of the suction stand 83 within a predetermined range along the X-axis direction.

The aspirator 80 is slightly energized leftward by an energizing unit (not shown) in FIG. 8. As shown in FIG. 8, movement of the front end of the suction pad 82 is restricted at a position slightly protruding from front ends of a pair of clampers 83a and 83a described below corresponding to the front end of the suction stand 83.

FIG. 9 is a perspective view of vicinities of the front ends of the slider 25, aspirator 80, and damper 83a viewed from the top left this side. However, the connection jig 50 is omitted for convenience' sake.

The bonding pads 28, 29, 30, and 31 connected to leads (not shown) of two heads are formed on the front 25b of the slider 25 bonded to the suspension tongue 20 (FIG. 3) of the flexure 8 as described above. Connection terminals 41, 42, 43, and 44 of four leads adjacently face the pads 28, 29, 30, and 31 one to one. These leads are fixed to the platform 39 of the flexure 8 through the insulating sheet 38 (FIG. 3) as described above.

The suction pad 82 has a band portion 91a formed by laterally extending a front-end plane 91 and a band portion 91b extended downward from the center of the portion 91a and is positioned so that the portion 91a contacts with the platform 39 of the flexure 8 and the portion 91b contacts with the middle portion held between two openings 21 and 22 (FIG. 3) when the front-end plane 91 moves along X-axis until it contacts with the flexure 8 after passing through the opening 16 of the load beam 6. In this case, four suction holes 87, 88, 89, and 90 provided for the portion 91a of the front-end plane 91 are formed so as to almost coincide with lead connection positions of the platform 39 one to one.

An ultrasonic bonder 77 has a clamper arm 111 held by a rotation axis 110 supported to a base 72 by a supporter (not shown) so as to be movable on X-Z plane. The clamper arm 111 holds an ultrasonic vibrator 76 extending almost in parallel with X-axis and is set so that the front end of a wedge 78 formed on the front end of the ultrasonic vibrator 76 to generate ultrasonic vibrations can work on the connection terminals 41, 42, 43, and 44 of four leads 32 held by the HG assembly 1 and the bonding pads 28, 29, 30, and 31 (FIG. 9). formed on the slider 25 as described later.

Details of the shape and setting angle of the wedge 78 and connective positional relations between the connection terminals 41, 42, 43, and 44 of four leads 32 on one hand and the bonding pads 28, 29, 30, and 31 formed on the slider 25 on the other will be described later.

A cam 115 is rotatably supported by a rotation axis 114 supported by the base 72 along Y-axis and rotated by a drive (not shown) in the direction of the arrow L. A roller holding material 112 for rotatably holding a roller 113 contacting with the outer periphery of the cam above the rotation axis 114 is set to a position of the clamper arm 111 facing the cam 115.

FIG. 8 shows a state in which the roller 113 contacts with a maximum-diameter portion of the cam 115. In this case, though the wedge 78 is about to move downward almost along Z-axis due to the weight of the ultrasonic vibrator 76 or the like, the roller 113 keeps a position separate from the HG assembly 1 because it is controlled by contacting with the cam 115.

The clamper arm 111 holds the ultrasonic vibrator 76 and a balancer 116 to be described later for adjusting the pressure of the wedge 78 is set to a position opposite to the ultrasonic vibrator 76 about the rotation axis 110. The above adjustment is performed by adjusting the distance of the balancer 116 from the rotation axis 110.

An ultrasonic oscillator 117 electrically drives the ultrasonic vibrator 76, ultrasonic-vibrates the wedge 78 at the front end along the X-axis direction and a proximity sensor 120 set nearby the damper arm 111 measures the distance from the damper arm 111 and outputs the information for rotational position of the clamper arm 111 to a controller 84.

The controller 84 is connected with the aspirator 80 through a tube 85 to draw the air incoming from four suction ports 87, 88, 89, and 90 provided for the front end 91 of the suction pad 82 in accordance with four leads and control operations of the entire ultrasonic-connecting unit 70 by controlling the ultrasonic oscillator 117 and a drive (not shown).

Connecting operations controlled by the controller 84 in the above configuration will be successively described below.

In the initial state of the ultrasonic-connecting unit 70, X-Y tables 74 and 73 are present at standby positions where the connection jig 50 to be mounted can be easily set or removed. Moreover, under connecting operation, the connection jig 50 is first moved to the position shown in FIG. 8, that is, the position where the front end of the wedge 78 can work on the connection terminals 41, 42, 43, and 44 of the four leads 32 held by the HG assembly 1 and the bonding pads 28, 29, 30, and 31 (FIG. 9) formed on the slider 25.

Then, the moving stand 81 is loaded and moves leftward along X-axis and the front-end plane 91 (FIG. 9) of the suction pad 82 contacts with the faced plane of the platform 39.

The moving stand 81 moves further leftward, a pair of clampers 83a and 83a passes through openings 21 and 22 of the flexure 8 and contacts with the faced plane of the slider 25, and the stand 81 stops moving while pressing the slider 25 at a predetermined pressure. In this case, the suction pad 82 slightly presses the platform 39 and the front-end plane 91 closely contacts with the platform 39.

Figure 10:
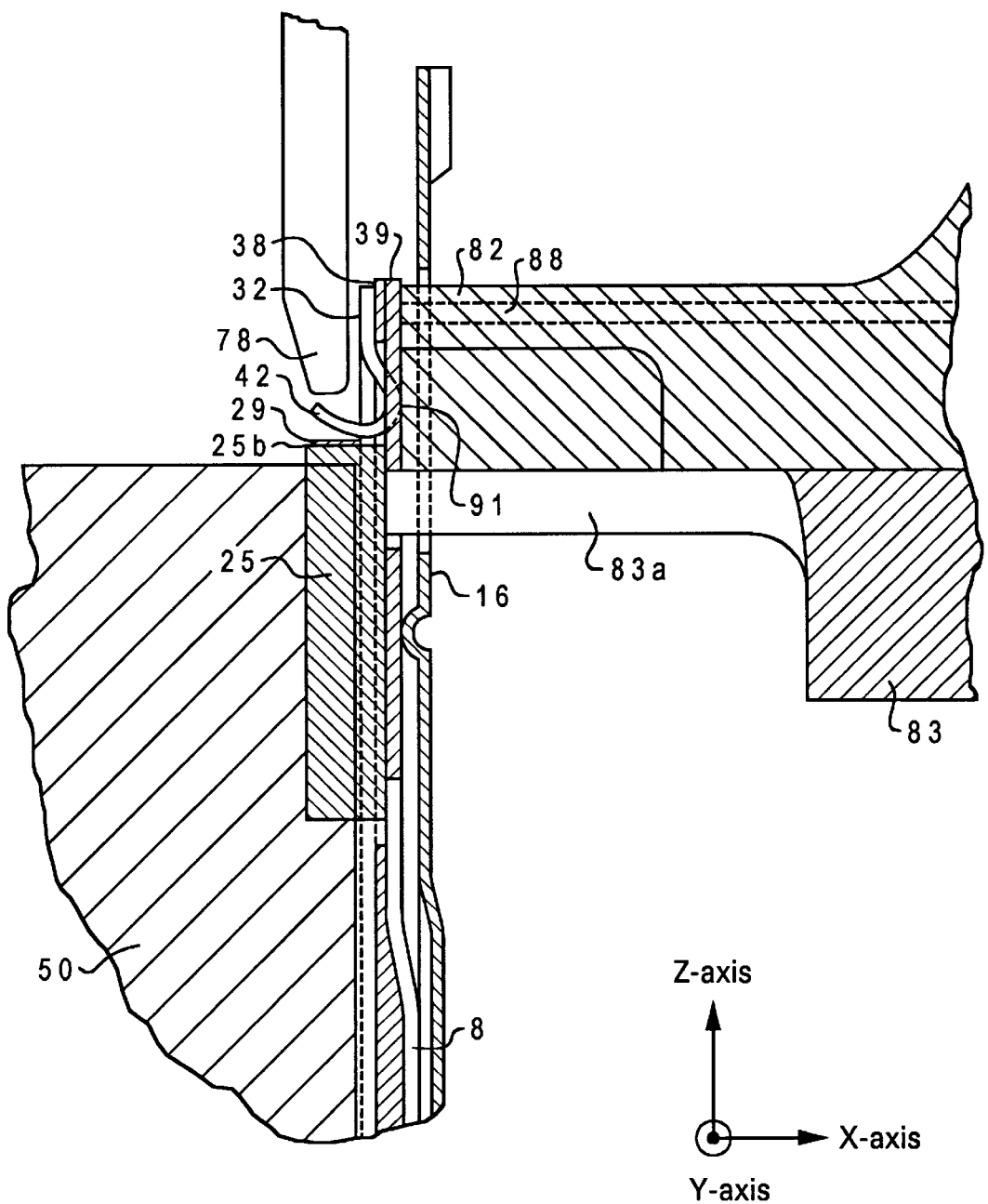
FIG. 10 is a sectional view of the vicinity of a slider when bringing a suction pad 82 and a damper 83 into contact with a platform 39 and a slider 25.

FIG. 10 is a sectional view of the vicinity of a slider when viewing the cross section of the connection jig 50 passing through the centerline 106 (FIG. 6) from the direction of the arrow G when the controller starts suction under the above state.

The slider 25 is accurately positioned by the slider fixing stand 60 (FIG. 7), slider fixing lever 56 (FIG. 7) of the connection jig 50, and damper 83a and its front 25a having the bonding pad 29 is parallel with x-y plane.

The damper 83a corresponds to a working unit for working on the slider 25 and the slider fixing stand 60 (FIG. 7) and slider fixing lever 56 of the connection jig 50 correspond to a position controller.

Moreover, the platform 39 at the front end of the flexure 8 is attracted to the four suction holes 87, 88, 89, and 90 of the suction pad 82 and held by the front-end plane 91 of the suction pad 82.

Figure 11:
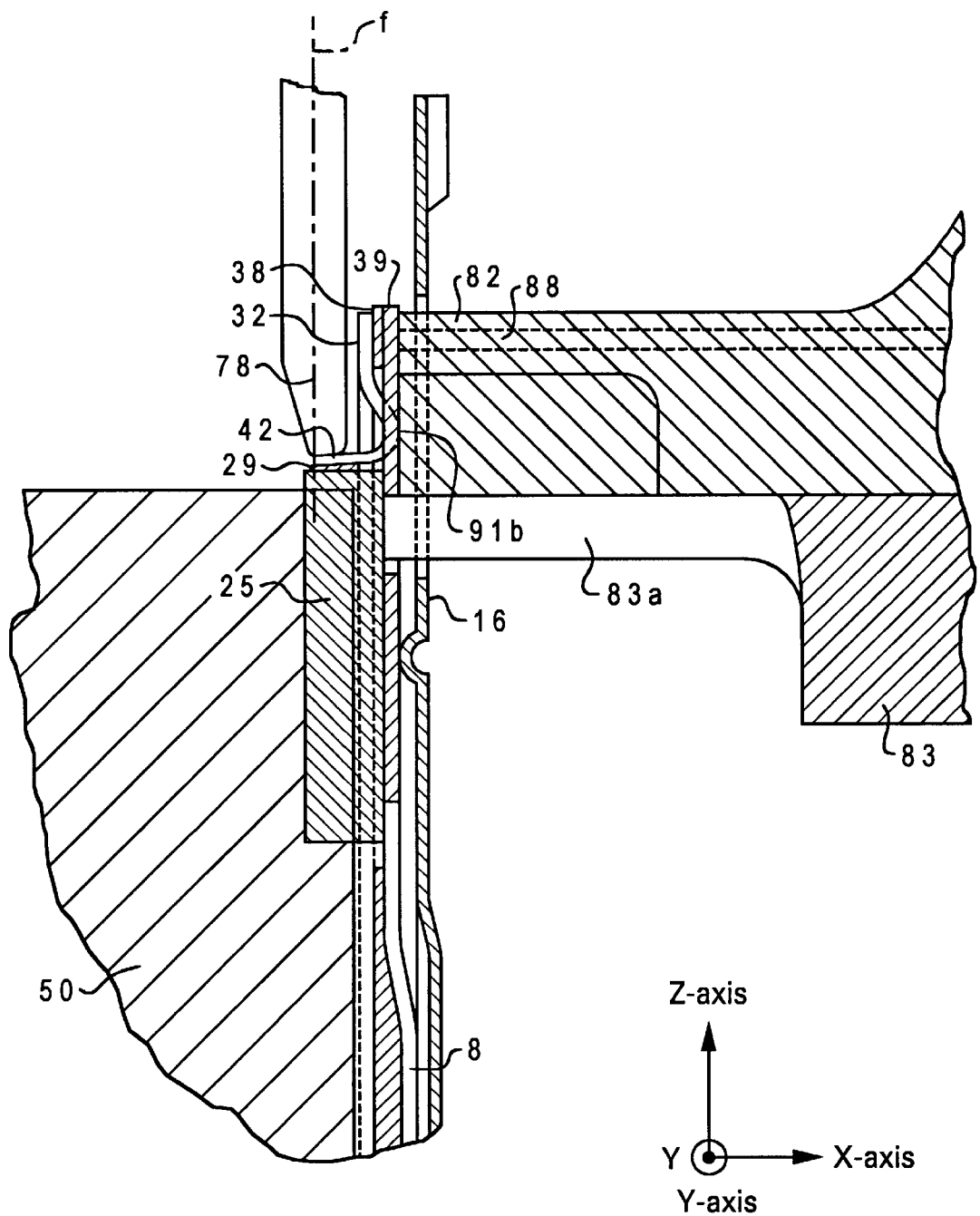
FIG. 11 is a sectional view of the vicinity of a slider when performing ultrasonic connection by operating the wedge 78 of an ultrasonic bonder 77.

Then, the cam 115 is rotated in the direction of the arrow L so that the minimum-diameter portion comes upward. In this case, the wedge 78 presses the connection terminal 42 of the lead 32 and moreover, plastically-deforms the bent portion of the lead 32 and presses the lead 32 against the boding pad 29 faced and contacted with the slider 25. FIG. 11 shows the above state. Moreover, the wedge 78 is set to the ultrasonic vibrator 76 so that the centerline f becomes parallel with Z-axis under the above state.

When the lead 32 is plastically deformed, a force for deflecting the platform 39 of the flexure 8 works but the suction pad 82 whose front-end plane 91 holds the platform 39 presents the platform 39 from being deflected. Therefore, the end of the portion 91b of the front-end plane 91 is configured so as to face the slider through the flexure 8 to prevent the suction pad 82 from moving leftward.

Moreover, the wedge 78 is ultrasonic-vibrated while the wedge 78 presses the connection terminal 42 against the bonding pad 30. The vibrational direction is a direction along X-axis. The pressure in the above case is adjusted to a desired value by moving the balancer 116 (FIG. 8).

The connection terminal 42 is crushed and deformed by the wedge 78 due to ultrasonic vibrations as described later. The deformation of the terminal 42 is monitored by obtaining the information for rotational position of the damper arm 111 output from the proximity sensor 120 and ultrasonic connecting operation between the bonding pad 30 and the connection terminal 42 is stopped when the front end of the wedge 78 reaches a predetermined stop position to be mentioned later.

Excitation conditions depend on the diameter or the like of a lead 32. In the case of this embodiment, the lead diameter is set to 50 mm, pressure is set to 75 gf, and ultrasonic frequency is set to 64 kHz.

The connecting operation according to the above conditions is applied to four corresponding connection terminals and bonding pads as shown in FIG. 9. The sequence of the connecting operation is properly determined. Therefore, the Y table 73 moves along the Y-axis direction to move the connection jig 50 to the optimum position for the connecting operation.

FIGS. 12 and 13 show the shape of the front end of the wedge 78. FIG. 12 is a front view of the front end viewed from the left along X-axis in FIG. 11 and FIG. 13 is a side view of the front end viewed from the surface direction of the drawing along Y-axis.

As shown in FIGS. 12 and 13, tapered planes 78a and 78b having an angle of 150 are formed at the both sides of the front and a tapered plane 78c having an angle of 250 is formed at the front. However, a faced plane 78d corresponding to the back plane of the wedge 78 and facing the platform 38 (FIG. 11) of the flexure 8 is flatly formed.

Moreover, the front-end plane 78e of the wedge 78 tilts by 3° in the direction in which the faced plane 78d corresponding to the back plane of the wedge 78 and separates from a plane vertical to the centerline f of the wedge 78 when viewed from the side plane as shown in FIG. 13.

When ultrasonic-vibrating the wedge 78 having the above shape in accordance with the above predetermined excitation conditions in the state shown in FIG. 11, the wedge 78 moves downward so as to crush the lead 42 as shown in FIG. 14. Moreover, the end 78f of the front-end plane 78e completes ultrasonic connection at a predetermined stop position before pressing the faced plane of the lead 42 and moves the wedge 78 upward so as to separate the wedge 78 from the lead 42.

The stop position is detected in accordance with the information for rotational position of the clamp arm 111 input to the controller 84 (FIG. 8) from the proximity sensor 120 as described above.

Figure 15:
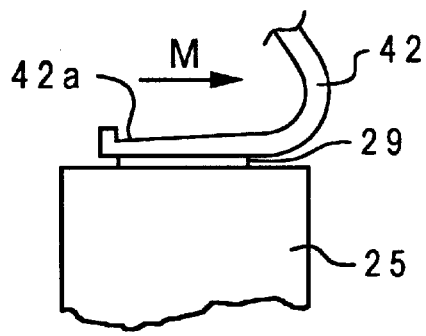
FIG. 15 is an illustration showing a deformed state of an ultrasonic-connected connection terminal.

FIG. 15 shows a deformed state of the connection terminal 42 of a lead after the ultrasonic connection is performed. Though a sudden changed portion of a sectional form which may cause stress concentration is present on the front-end side deformed portion 42a of a joint, no sudden changed portion is present at the external connection side (direction shown by the arrow M) connected to the multiple connector 34 (FIG. 1).

Figure 16:
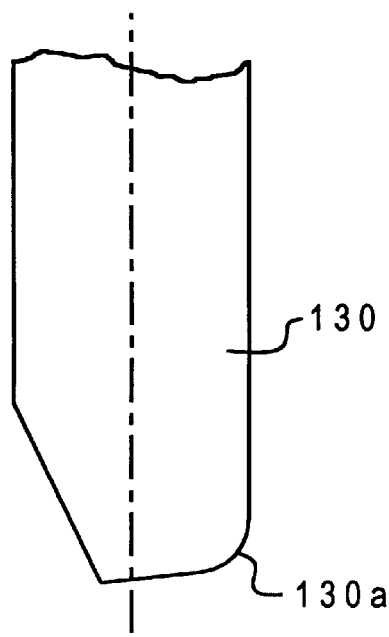
FIG. 16 is a block diagram showing another embodiment of a wedge.

FIG. 16 is a block diagram of a wedge 130 showing another embodiment of a wedge shape formed by an ultrasonic-connecting method of the present invention, which has completely the same shape as the wedge 78 except that a rounded portion 130a having a predetermined radius is formed at a portion corresponding to the end 78f of the wedge 78 shown in FIG. 13.

Figure 17:
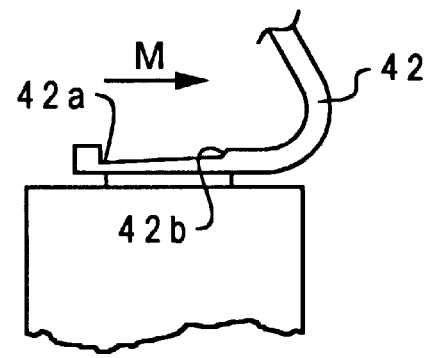
FIG. 17 is an illustration showing a deformed state of an ultrasonic-connected connection terminal.

FIG. 17 shows a deformed state of the connection terminal 42 of a lead after ultrasonic connection is performed by using the wedge 130 instead of the wedge 78 mentioned above. In this case, a sudden changed portion having a sectional form causing stress concentration is present at the front-end-side deformed portion 42a of a joint but no sudden changed portion is present at the external connection side connected to the multiple connector 34 (FIG. 1) shown by the arrow M though a loose curved surface 42b due to a rounded portion is present.

Figure 18:
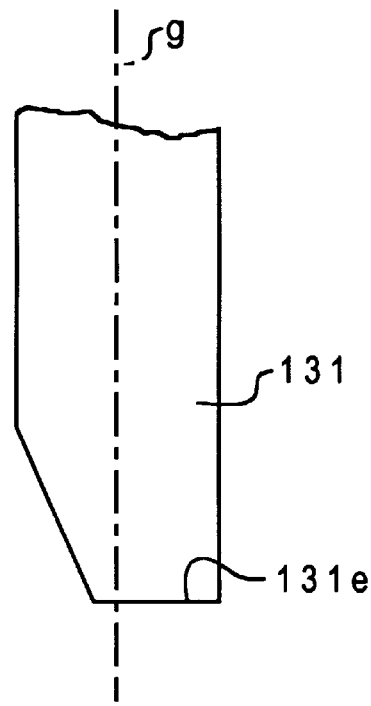
FIG. 18 is a block diagram showing still another embodiment of a wedge.

FIG. 18 is a block diagram of a wedge 131 showing still another embodiment of a wedge shape formed by an ultrasonic-connecting method of the present invention, which has completely the same shape as the wedge 78 except that the front-end plane 131e corresponding to the front-end plane 78e of the wedge 78 shown in FIG. 13 is formed vertically to the center line g.

Figure 19:
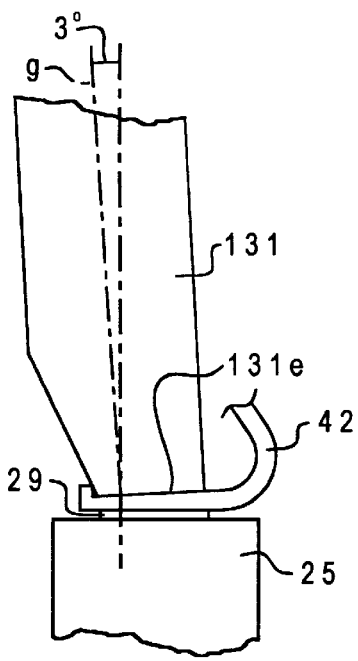
FIG. 19 is an illustration showing a state for a wedge 131 to press the connection terminal of a lead.

The wedge 131 is set to the above-described ultrasonic vibrator 76 (FIG. 8) so that the centerline g of the wedge 131 has a tilt of approx. 3° from Z-axis as shown in FIG. 19 while adjusting a setting angle, pressing the connection terminal 42 of a lead as shown in FIG. 11, and plastically deforming the bent portion of the lead 32 while pressing the bent portion against the bonding pad 29 faced and contacted with the slider 25.

By performing setting as described above, the condition for the front-end plane 131e to press the connection terminal 42 becomes almost the same as the case in FIG. 14 described above and thereby, no sudden changed portion is present at the external connection side (direction shown by the arrow M) connected to the multiple connector 34 (FIG. 1) in the deformed state of the connection terminal 42 of the lead after the ultrasonic connection is performed though a sudden changed portion having a sectional form causing stress concentration is present on the front-end-side deformed portion 42 of the joint as shown in FIG. 15.

Then, the connective positional relations between the connection terminals 41, 42, 43, and 44 (FIG. 9) of four leads 32 and the bonding pads 28, 29, 30, and 31 formed on the slider 25 will be described below.

Figure 20:
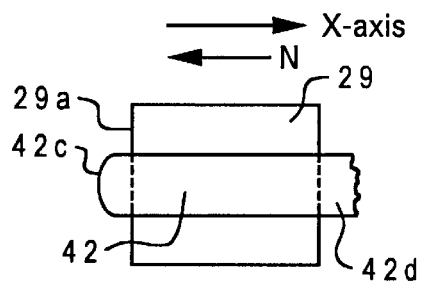
FIG. 20 is an illustration for explaining the positional relation between the connection terminal 42 of a lead and a bonding pad 29.

FIG. 20 shows the state in FIG. 11, that is the positional relation between the connection terminal 42 of the lead 32 and the bonding pad 29 faced and contacted with the slider 25 when the wedge 78 presses the connection terminal 42 and moreover, plastically deforms the lead 32 and presses it against the bonding pad 29.

The gold-plated connection terminal 42 faces and contacts with the similarly gold-plated bonding pad 29 and extends along X-axis and is pressed against the bonding pad 29 by a wedge for ultrasonic connection and vibrated in the direction along X-axis. In this case, the terminal 42 is set so that its front end 42 vibrates at a position protruded from one side 29a of the bonding pad 29 in the direction of the arrow N parallel with X-axis in the same direction.

Because the front end 42 is set as described above, it is possible to prevent the gold plated on the surface of the bonding pad 29 for ultrasonic connection from being pushed out in the direction of the arrow N from the bonding pad 29 by the front end 42c of the connection terminal 42.

Ultrasonic connection between the bonding pad 29 and the connection terminal 42 is described above. Other bonding pads 28, 30, and 31 and connection terminals 41, 43, and 44 are similarly arranged and ultrasonic-connected each other.

Figure 21:
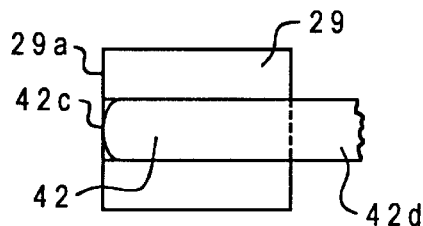
FIG. 21 is an illustration for explaining the positional relation between the connection terminal 42 of a lead and a bonding pad 29.

Moreover, FIG. 21 shows an example in which the front end 42c of the connection terminal 42 is set to a position slightly protruded from one side 29a of the bonding pad 29. Also in this case, it is possible to prevent gold from being pushed out for ultrasonic connection.

Then, a method for inspecting a joint formed through ultrasonic connection will be described below.

Figure 22:
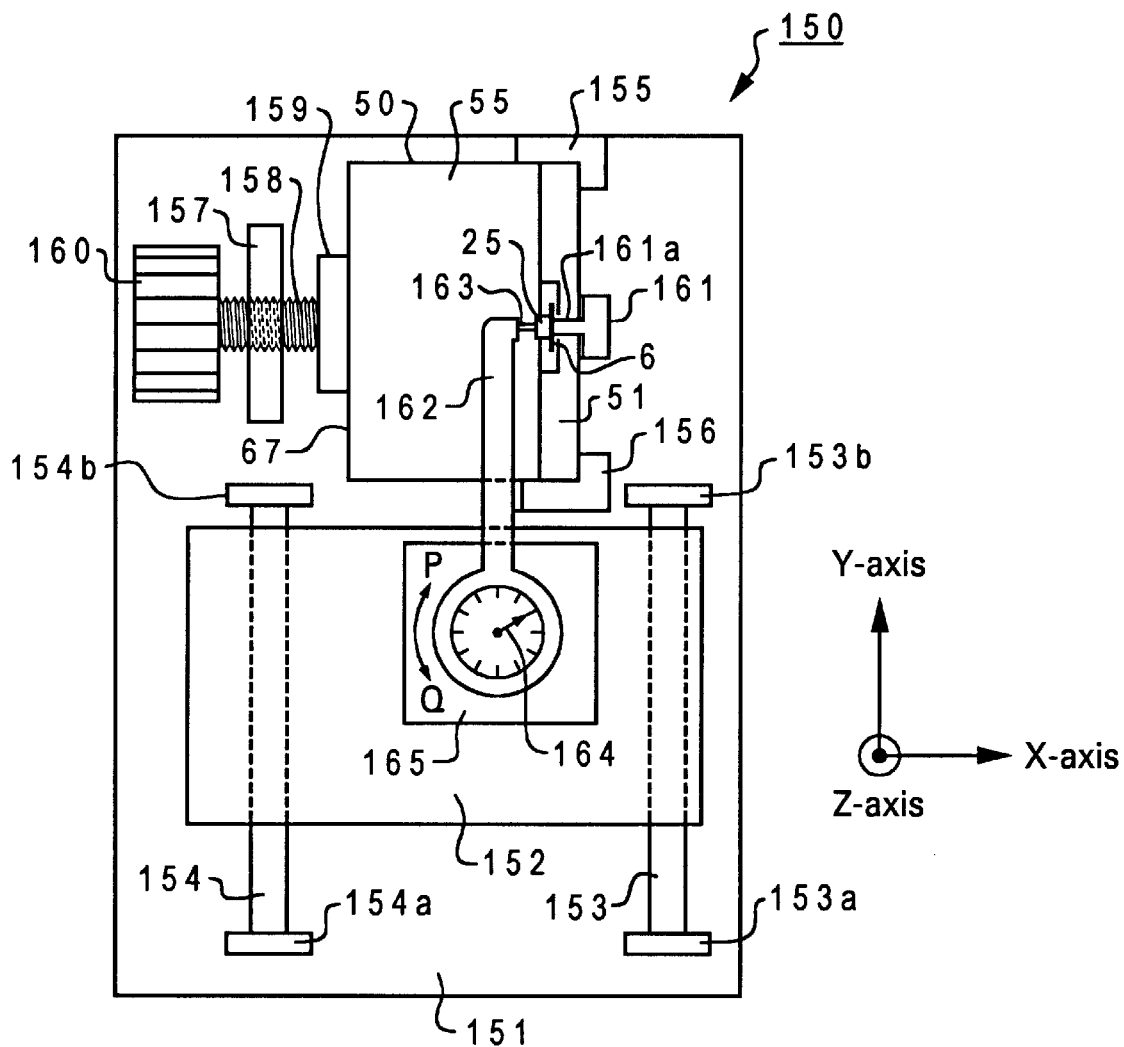
FIG. 22 is a top view showing the configuration of a lead push tester 150 used for a joint inspection method of the present invention.

FIG. 22 is a top view showing the configuration of a lead push tester 150 for inspecting the joint between each bonding pad of a slider 25 and each connection terminal of a lead 32 connected through ultrasonic connection.

A connection jig 50 is mounted on a base 151 of the lead push tester 150 while holding an HG assembly 1 ultrasonic-connected by the ultrasonic-connecting unit 70 in FIG. 8 as described above. In this case, the side plane 55 of the connection jig 50 is turned upward and an HG-assembly holding plate 51 is brought into contact with guides 155 and 156 formed on the base 151 and positioned.

A screwing plate 157 stood from the base 151 is screwed with a screw 158 having a turn knob 160 to hold the screw 158. A pressing plate 159 is set to the front end of the screw 158 and configured so as to move along X-axis without rotating in accordance with the rotation of the screw 158 on its axis.

The connection jig 50 positioned by contacting the guides 155 and 156 is firmly fixed onto the base 151 when an operator turns the turn knob 160 and the pressing plate 159 presses the bottom 67 of the jig 50.

The front end 161a of a support arm 161 stood from the base 151 supports the front ends of the slider 25 and flexure 8 in order to support the front end of the HG assembly 1 so that it is not deformed when a lead push test to be mentioned later is performed. The state of support by the arm 161 will be described below by referring to enlarged FIG. 23.

Figure 23:
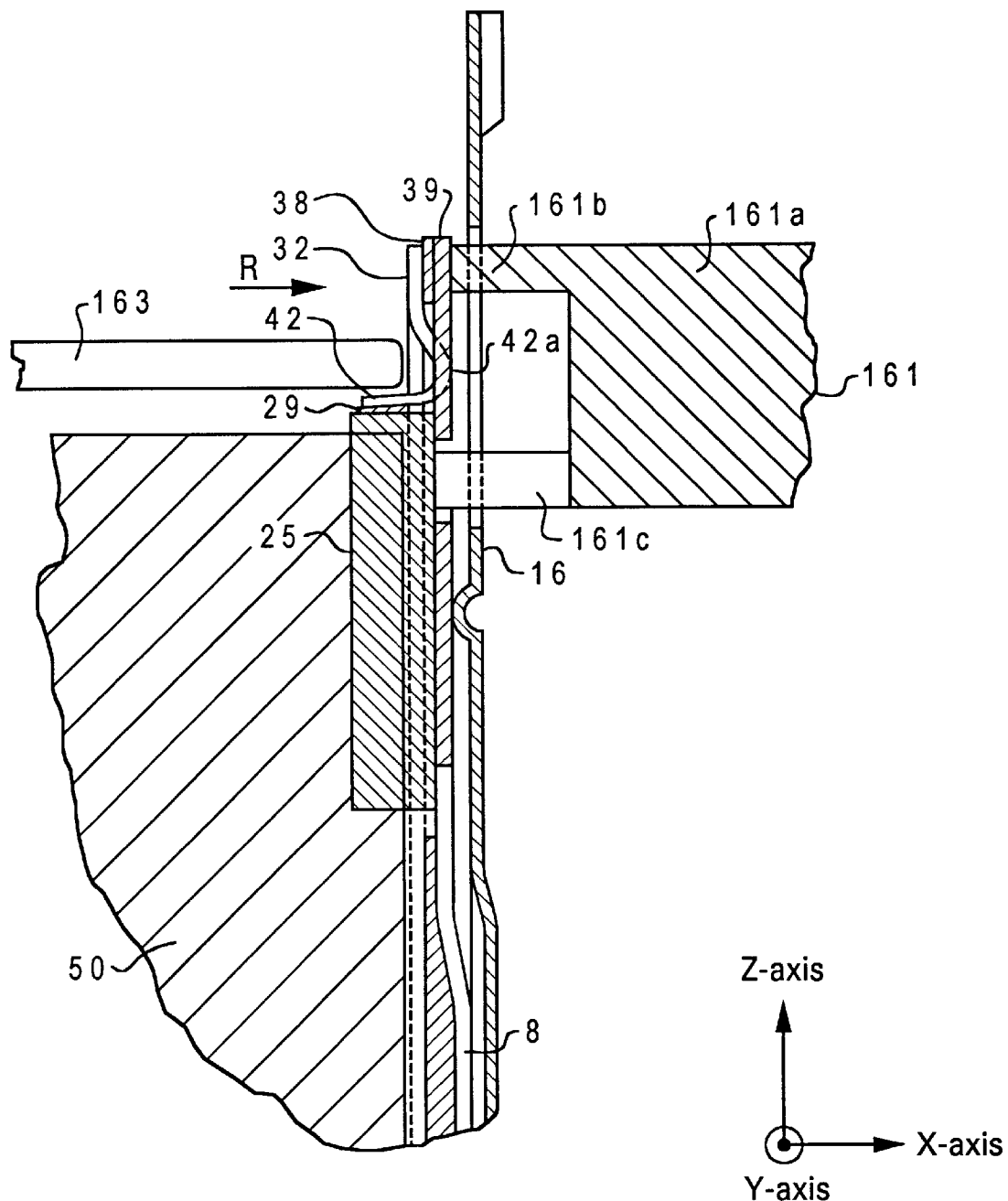
FIG. 23 is an enlarged view of the vicinity of a slider 25 when a connection jig 50 is fixed onto a base 151.

Enlarged FIG. 23 is a sectional view of the vicinity of a slider when viewing a cross section of the connection jig 50 passing through the centerline 106 (FIG. 6) from the direction of the arrow G, in which a pair of slider holders 161c formed on the front end 161a of the support arm 161 supports the faced and contacted plane of the slider 25 through the opening 16 of a load beam and the openings 21 and 22 (FIG. 9) of the flexure 8 similarly to the case of the damper 83a shown in FIG. 9 and a platform holder 161b supports a flat form 39 through the opening 16 of the load beam.

A moving stand 152 is slidably supported by a pair of guide rails 153 and 154 extending along and in parallel with Y-axis on the base 151 and moved by a drive (not shown) in the Y-axis direction. The guide rail 153 is fixed onto the base 151 by supports 153a and 153b and the guide rail 154 is fixed onto the base 151 by supports 154a and 154b.

A tension gauge 165 is mounted on the moving stand 152. The tension gauge 165 supplies torque to the tension arm 162, makes a pushpin 163 set to the front end of the tension arm 162 work on an object to be tested, and displays the then pressure on a tension meter 164. A joint inspection method of the present invention makes the pushpin 163 work on the lead 32 (FIG. 23) ultrasonic-connected to the slider 25 and the procedure for making the pin 163 work on the lead 32 will be described below.

When the connection jig 50 is fixed to the base 151 as described above, the tension arm 162 is retreated to a standby position (not shown) not so as to disturb the operation for fixing the jig 50. When the connection jig 50 is fixed, the tension arm 162 rotates in the direction of the arrow P and is moved to the operating position shown in FIG. 22.

The position of the pushpin 163 shown in FIG. 23 corresponds to the above operating position. The pushpin 163 approaches a bent portion 42a bent like a hook of a connection terminal 42 almost along X-axis in accordance with the rotation of the tension arm 162 in the direction of the arrow P and then presses the portion 42a. Moreover, to face and contact with the bent portion of a desired connection terminal out of the four connection terminals 41, 42, 43, and 45 shown in FIG. 9, the pin 163 moves the moving stand 152 along Y-axis and thereby, the position of the pushpin 163 in the Y-axis direction is adjusted.

Figure 24:
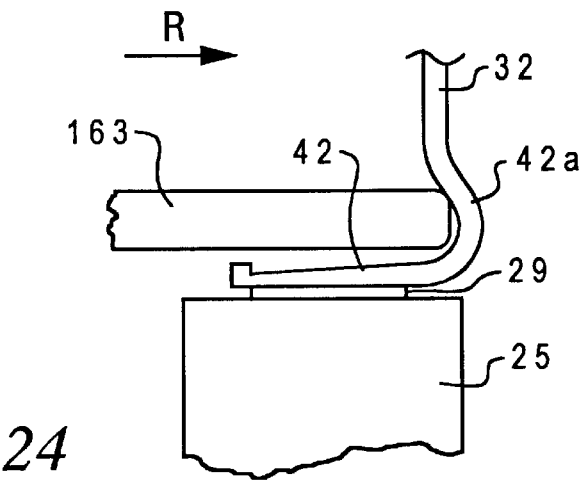
FIG. 24 is an illustration for explaining the state of a connection terminal 42 when receiving the action of a pushpin 163 under joint inspection.

Thus, the pushpin 163 moves the moving stand 152 to a position where the pin 163 can press the connection terminal 42 and operates the tension gauge 165 at the position. Thereby, the tension arm 162 rotates in the direction of the arrow P, the pushpin 163 moves in the direction of the arrow R almost along X-axis in accordance with the rotation of the arm 162, and the front end of the pin 163 contacts the bent portion 42a of the connection terminal 42. FIG. 24 shows the state in the above case.

Figure 25:
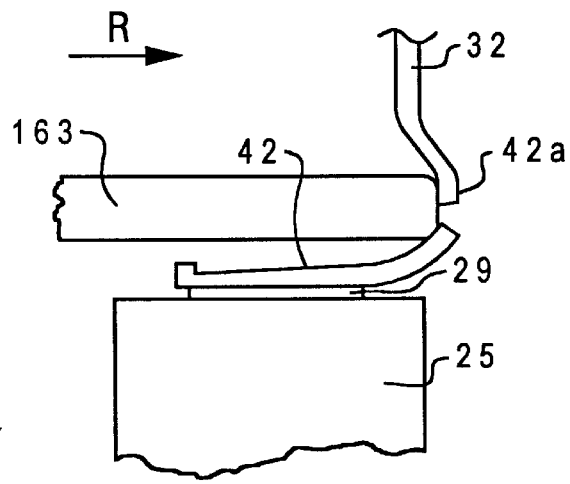
FIG. 25 is an illustration for explaining the state of a connection terminal 42 when receiving the action of a pushpin 163 under joint inspection.
Figure 26:
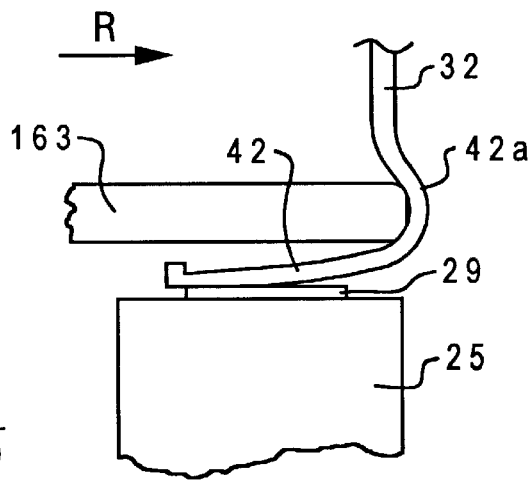
FIG. 26 is an illustration for explaining the state of a connection pin 42 when receiving the action of a pushpin 163 under joint inspection.

FIGS. 24 to 26 show only the slider 25, the connection terminal 42 of the lead 32, the bonding pad 29, and the pushpin 163, in which the slider 25 and the lead 32 fixed to the platform 39 (FIG. 23) are firmly fixed by the support arm 161 (FIG. 23) as described above and the pushpin 163 is supported by the tension arm 162 (FIG. 22).

The tension arm 162 further rotates in the direction of the arrow P from the state in FIG. 24. When the pushpin 163 presses the connection terminal 42 in the direction of the arrow R, the connection terminal 42 shows two roughly-divided states correspondingly to the above operation.

When the connection terminal 42 is preferably connected with the bonding pad 29, it is soon broken as shown in FIG. 25 and the tension meter 164 shows the tension at the point of time when the terminal 42 is broken.

When the connection terminal 42 is not preferably connected with the bonding pad 29, however, the connection terminal 42 slowly separates from the bonding pad 29 as shown in FIG. 26 and then, completely separates or it is broken while a part of the terminal 42 is connected. Also in this case, the tension meter 164 shows the tension at the point of time when the terminal 42 completely separates or it is broken.

In this joint inspecting method, when a connection terminal is broken, it is possible to judge that ultrasonic connection is preferably performed. Moreover, even when the terminal completely separates, it is possible to judge the degree of the quality of connection from the tension at that point of time. The joint inspection is regularly executed in a production line in order to prompt the inspection, that is, to reset the above excitation condition such as pressure in the ultrasonic-connecting unit 70 shown in FIG. 8 in accordance with an inspection result.

In the case of the above embodiment, the pressure for the clamper 83a to press a slider is determined in accordance with the movement of the moving stand 81 (FIG. 8). But it is not limited to this, it is permitted to adjust a pressing force by air pressure.

In the case of the above embodiment, the information for rotational position of the damper arm 111 is obtained by the proximity sensor 120 (FIG. 8). But it is not limited to this, it is permitted to obtain the information for rotational position by a potentiometer to be rotated synchronously with the rotation of the damper arm 111.

Furthermore, the above embodiment uses a configuration of rotating the tension arm 162 of the lead push tester 150 (FIG. 22) to make the pushpin 163 work on an object to be tested. But it is not limited to this, it is permitted to replace the arm 162 with an unit having the same function as the arm 162, that is, to make the pushpin 163 work on an object to be tested by using the moving stand 152 as an X-Y table and sliding the tension gauge 165 to be mounted in the X-axis direction. The present invention makes it possible to prevent a lead nearby a joint from being broken due to a load applied to the lead because no sudden changed portion having a sectional form causing stress concentration is present at the external connection side to be connected to the outside in the shape of a connection terminal of a lead deformed due to ultrasonic connection.

The present invention makes it possible to realize ultrasonic connection even in a restricted space because the faced plane 78d facing the platform 38 (FIG. 11) of the wedge 78 is flatly formed as shown in FIG. 13.

The present invention makes it possible to solve the problem that gold is pushed out from the range of the bonding pad 29 because the front end 42c of the connection terminal 42 is set so as to vibrate at a position protruded from the range of the bonding pad 29 when performing ultrasonic connection as shown in FIG. 20.

The present invention makes it possible to concentrate ultrasonic energy on a joint because the slider 25 is directly pressed against the slider fixing stand of the connection jig 50 by the damper 83a and thereby, the slider 25 is firmly fixed when ultrasonic connection is performed as shown in FIG. 11.

The present invention makes it possible to cancel a factor of imperfect connection because the stop position of the front end of the wedge 78 is monitored by the proximity sensor shown in FIG. 8 when ultrasonic connection is performed and thereby, deformed values of connection terminals can be arranged into an optimum state.

A joint inspecting method of the present invention makes it possible to perform an inspection without damaging adjacent connection terminals because the inspection is performed by pressing the pushpin 163 against the connection terminal of an ultrasonic-connected lead as shown in FIG. 23. Moreover, to check other connection terminals, it is only necessary to move the moving stand 152 for mounting the tension gauge 161 as shown in FIG. 22 and thereby, it is possible to improve the operability.

Figure 28:
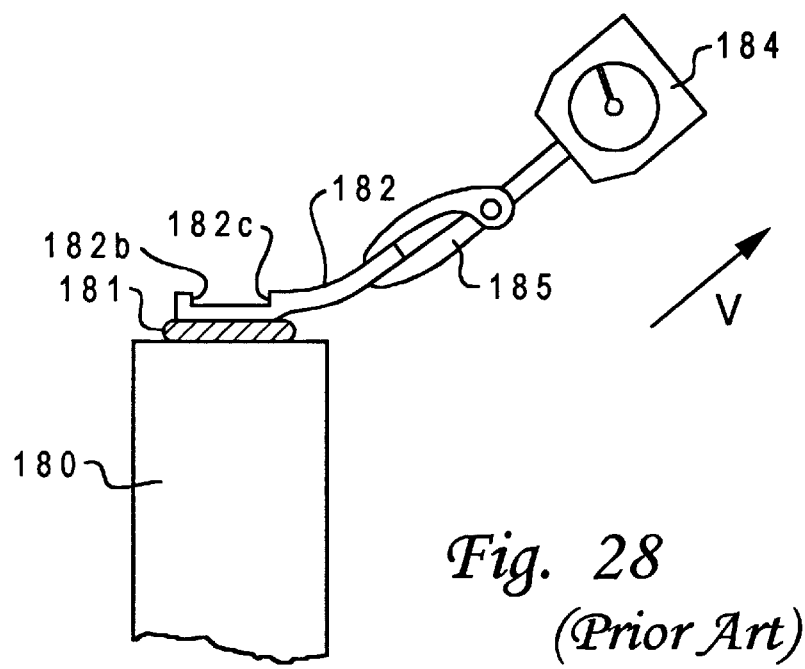
FIG. 28 is an illustration for explaining a conventional joint inspection method.

FIG. 28 shows the shape of the lead 182 deformed due to ultrasonic connection, in which sudden change portions 182b and 182c respectively having a cross sectional causing stress concentration are present at the front-end side and external connection side of the joint. Because a load due to various factors is applied to the sudden change portion 182c at the external-connection side, it may be broken.

Moreover, vibrations are conventionally applied by a predetermined period under ultrasonic connector. In this case, a deformed value of a lead is not kept constant due to various conditions including the fluctuation of lead shapes and thereby, imperfect connection occurs.

Figure 29:
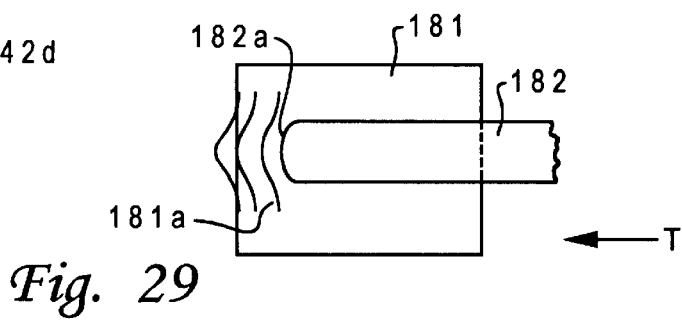
FIG. 29 is an illustration showing a state for gold to be pushed out from the range of a bonding pad under conventional ultrasonic connection.
Figure 27:
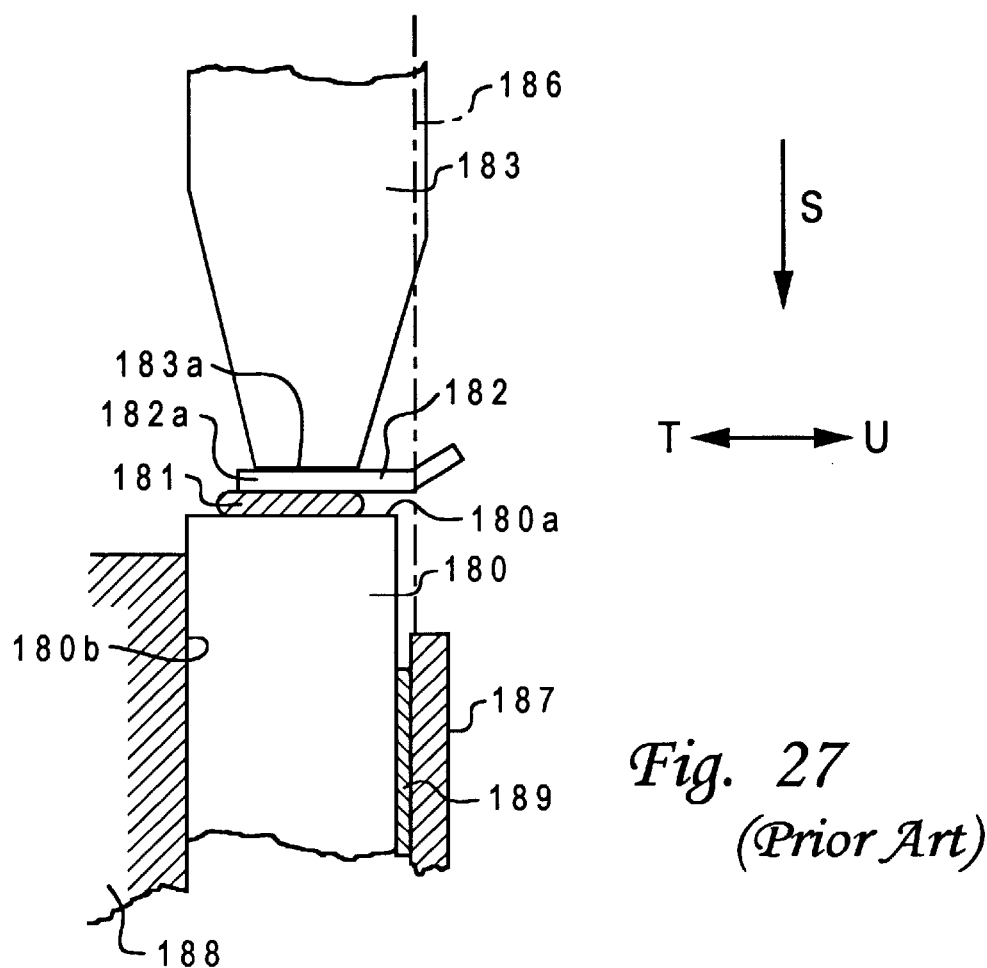
FIG. 27 is an illustration for explaining conventional ultrasonic connection.

FIG. 29 shows a state in which gold 181a plated on the surface of the bonding pad 181 is pushed out in the direction of the arrow T which is one of the arrows in the vibrational direction from the range of the bonding pad 181 by the front end 182a of the lead 182 due to ultrasonic vibrations at the time of ultrasonic connection under the setting condition in FIG. 27.

Thus, some of gold plated on the bonding pad 181 is pushed out by the operation of vibration and present in a hard disk in the form of pieces and thereby, the pieces may cause troubles.

Moreover, because the above-described slider 180 is fixed through the suspender 189, it is easily influenced by slight vibrations under ultrasonic welding, vibrations are propagated to the slider and thereby, energy is dispersed, causing ultrasonic energy loss at a joint.

Moreover, FIG. 27 shows a dead line 186 on which the holder of the slider 180 or the wiring route of the lead 182 is present by a dotted line. When the deadline is present in the direction in which a deadline wedge 183 exists, a problem occurs that the deadline collides with the wedge 183 whose front end is tapered in four directions.

Figure 30:
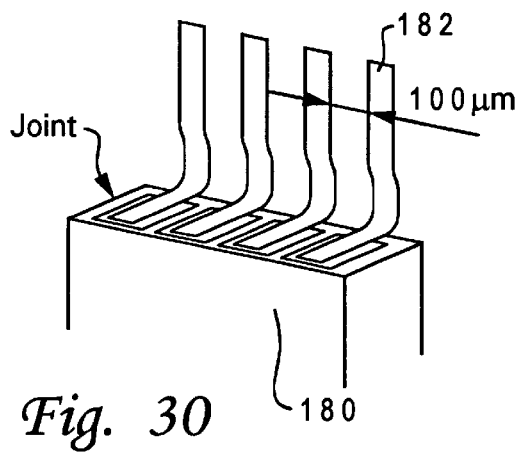
FIG. 30 is a perspective view showing joints between a slider 180 and four leads 182.

Moreover, FIG. 30 is a perspective view showing the joint between the slider 180 and four leads 182. As shown in FIG. 30, when the interval between adjacent leads is approx. 100 mm, it is difficult to hold only a desired lead without scratching adjacent leads by the clamper 185 shown in FIG. 28 and thereby, the operability of joint inspection is extremely deteriorated.

While the invention has been particularly shown and described with reference to a preferred embodiment, it will be understood by those skilled in the art that various changes in form and detail may be made therein without departing from the spirit and scope of the invention.

What is claimed is:

1. A method for ultrasonically connecting a plurality of bonding pads formed on a predetermined plane of a slider held by slider holding means accessible to the recording plane of a disk of a disk drive, with a plurality of leads held by the slider holding means and formed so that joints of the leads face the bonding pads one to one, comprising the step of:

working a front-end plane of a wedge on the joints that is tilted in a direction in which first sides of the joints correspond to external connection sides of the joints and retreat from a predetermined plane of the slider in order to perform ultrasonic connection by pressing the joints of the leads against the bonding pads.

2. The method according to claim 1, further comprising working a central axis of the wedge on the joints while tilting the central axis from the predetermined plane.

3. The method according to claim 1, further comprising rounding an end of the first side on the front-end plane of the wedge.

4. The method according to claim 1, further comprising tilting the front-end plane at an angle of approximately 3°.

5. A method for connecting a plurality of bonding pads formed on a slider integrally fixed to a flexure accessible to the recording plane of a disk of a disk drive, with a plurality of leads which are fixed to at least the platform of the flexure and whose joints are formed on the bonding pads so as to respectively face each of the bonding pads, comprising the step of:

pressing the joints of the leads against the bonding pads, wherein a side plane of the wedge facing the platform and working on the joints is not tapered in order to perform ultrasonic connection.

6. The method according to claim 5, further comprising forming the side plane of the wedge facing the platform into a plane.

7. A method for connecting a plurality of bonding pads formed on a slider held by slider holding means accessible to the recording plane of a disk of a disk drive through elastic means with a plurality of leads which is held by the slider holding means and whose joints are formed so as to respectively face each of the bonding pads, comprising the step of:

pressing the joints of the leads against the bonding pads wherein the front ends of the leads are arranged so as to be located outside of a range of the bonding pads when performing ultrasonic connection.

8. A method for connecting a plurality of bonding pads formed on a slider held by slider holding means accessible to the recording plane of a disk of a disk drive through elastic means with a plurality of leads formed so as to respectively face each of the bonding pads, comprising the steps of:

controlling a position of the slider on at least one side of a vibrational direction under ultrasonic connection such that movement of the slider in the vibrational direction is fixed; and pressing the slider by directly working on the slider from another side of the vibrational direction.

9. A method for connecting a plurality of bonding pads formed on a predetermined plane of a slider held by slider holding means accessible to the recording plane of a disk of a disk drive with a plurality of leads which is held by the slider holding means and whose joints are formed so as to respectively face each of the bonding pads, comprising the steps of:

monitoring movement of a wedge working on the joints in order to perform ultrasonic connection by pressing the joints of the leads against the bonding pads; and stopping the ultrasonic connection in accordance with movement information showing the movement of the wedge.

10. A method for inspecting joints formed by ultrasonically connecting a plurality of bonding pads formed on a slider held by slider holding means accessible to the recording plane of a disk of a disk drive with a plurality of leads which is held by the slider holding means and whose joints are formed so as to respectively face each of the bonding pads, comprising the step of inspecting a connected state by pressing a pushpin against the vicinity of the joints where the leads are ultrasonically connected.

11. The method according to claim 10, further comprising detecting tension when a pushpin is pressed against a vicinity of a joint.

* * * * *

UNITED STATES PATENT AND TRADEMARK OFFICE
CERTIFICATE OF CORRECTION

PATENT NO. : 6,355,122 B1  
DATED : March 12, 2002  
INVENTOR(S) : Kenji Itoh et al.

It is certified that error appears in the above-identified patent and that said Letters Patent is hereby corrected as shown below:

Column 9,  
Line 13, after the word "The" please change "damper" to -- clamper --.  
Line 35, after the word "slider" please insert the number -- 25 --.

Column 10,  
Line 2, after the word "of" please change "150" to -- 15º --.  
Line 3, after the word "of" please change "250" to -- 25º --.

Column 13,  
Line 32, after the word "the" please change "damper" to -- clamper --.  
Line 36, after the word "the" please change "damper" to -- clamper --.

Signed and Sealed this

Eleventh Day of June, 2002

Attest:

JAMES E. ROGAN  
*Director of the United States Patent and Trademark Office*

*Attesting Officer*